United States Patent [19]

Lee

[11] Patent Number: 5,670,043
[45] Date of Patent: Sep. 23, 1997

[54] MULTI-FUNCTION SELF-CLEANING FLUID TREATMENT SYSTEM AND METHOD FOR USING THE SAME

[75] Inventor: Sun Y. Lee, Arvada, Colo.

[73] Assignee: Coors Brewing Company, Golden, Colo.

[21] Appl. No.: 649,183

[22] Filed: May 17, 1996

Related U.S. Application Data

[63] Continuation-in-part of Ser. No. 383,248, Feb. 3, 1995, Pat. No. 5,543,087, which is a continuation-in-part of Ser. No. 168,954, Dec. 17, 1993, Pat. No. 5,387,339.

[51] Int. Cl.$^6$ ................................................. B01D 33/073
[52] U.S. Cl. .................. 210/396; 210/326; 210/327; 210/330; 210/360.2; 210/323.2; 210/321.68; 210/321.89
[58] Field of Search ................................. 210/325, 326, 210/327, 329, 330, 332, 334, 396, 360.2, 321.89, 321.68, 394, 497.01

[56] References Cited

U.S. PATENT DOCUMENTS

| | | |
|---|---|---|
| 590,968 | 10/1897 | Davis . |
| 740,574 | 10/1903 | Kohlmeyer . |
| 781,107 | 1/1905 | Stewart . |
| 810,020 | 1/1906 | Applegate . |
| 2,243,559 | 5/1941 | Griffith . |
| 2,354,150 | 7/1944 | Skinner . |
| 3,286,843 | 11/1966 | Kraissl . |

FOREIGN PATENT DOCUMENTS 367358  2/1932  United Kingdom .

*Primary Examiner*—Thomas M. Lithgow
*Attorney, Agent, or Firm*—Klaas, Law, O'Meara & Malkin, P.C.; Jay K. Malkin

[57] ABSTRACT

A multi-function fluid treatment system which can filter fluids or diffuse gases into liquids. To achieve filtration, the system includes a housing with multiple filter cartridges therein. The cartridges are connected to a drive system which rotates them in unison. Fluids to be filtered enter the housing and surround the cartridges. Cartridge rotation scrubs solids from the cartridges and promotes fluid flow therein. A separate cleaning system is also provided which involves a cartridge wiping assembly having multiple wiping members thereon. The wiping members directly contact the cartridges to remove collected debris and preferably involve multiple bristles secured to a vertical support member. The support member may consist of dual wires secured together with the bristles therebetween. The bristles can also be arranged in elongate rows (one row per cartridge) on the support member. In either embodiment, the wiping assembly improves filtration efficiency and reduces maintenance requirements.

2 Claims, 12 Drawing Sheets

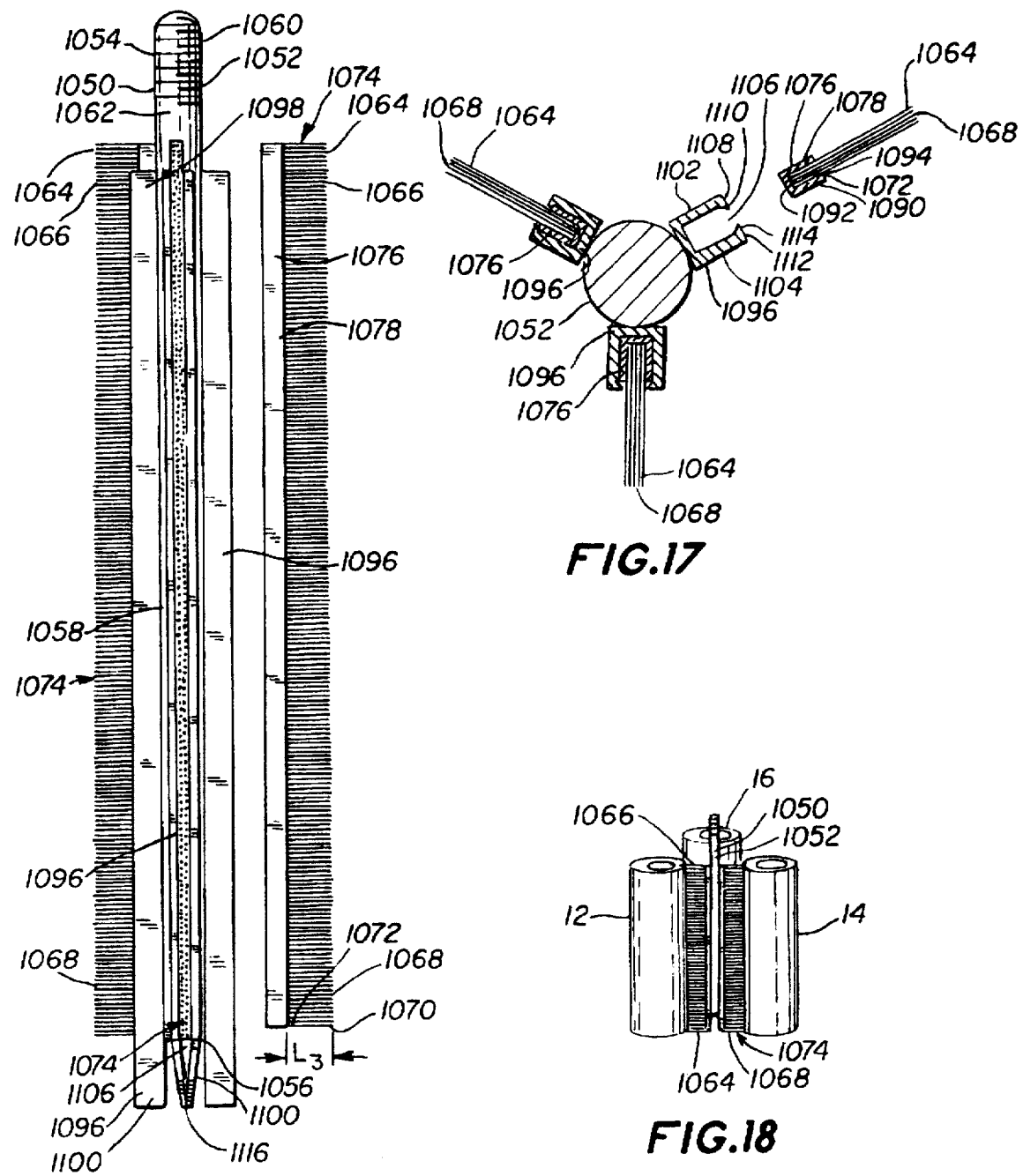

MULTI-FUNCTION SELF-CLEANING FLUID TREATMENT SYSTEM AND METHOD FOR USING THE SAME

This application is a continuation-in-part of U.S. patent application Ser. No. 08/383,248 filed Feb. 3, 1995 (now U.S. Pat. No. 5,543,087) which is a continuation-in-part of Ser. No. 08/168,954 filed Dec. 17, 1993 now U.S. Pat. No. 5,387,339.

BACKGROUND OF THE INVENTION

The present invention generally relates to multi-function fluid treatment systems, and more particularly to a fluid treatment system which is capable of (1) high-efficiency, low maintenance filtration of fluid materials containing suspended solids; and (2) rapid and complete dissolution of a selected gas within a fluid material. The present invention also generally relates to a fluid treatment system which has self-cleaning capabilities. The functional capabilities of the fluid treatment system described herein will depend on the specific system configuration and the manner in which the system is used. Regardless of which function is selected in accordance with the present invention, a common feature of importance involves the use of multiple rotating cartridge units for filtration or gas introduction purposes as discussed below.

Regarding the separation of solid materials from fluids, fluid treatment systems play an important role in a wide variety of industrial and commercial processes. In addition, high efficiency fluid treatment systems are currently being using in numerous medical applications, including but not limited to blood filtration and the separation of microorganisms (e.g. bacteria) from biological or other fluids. Accordingly, recent advances in separation technology have created fluid treatment systems which are capable of removing solid materials of a very small size from selected liquids. Many of these systems involve the use of a sophisticated membrane structure associated with a cylindrical cartridge unit. Membrane-type cartridge units are basically described in U.S. Pat. Nos. 4,790,942; 4,867,878; 4,876,013; 4,906,379; 4,911,847; and 5,000,848. All of these references disclose single, membrane-type rotating cartridge units and/or components associated therewith.

Notwithstanding the foregoing filtration units and components, a need exists for a fluid treatment system which is capable of removing substantial quantities of solid materials from liquids or slurries having large amounts of solids therein. When the filtration of these materials is attempted using conventional filter systems, filtration efficiency decreases substantially for numerous reasons. Primarily, the exposed surfaces of the filtration media become clogged or blocked with solid materials, thereby slowing the separation process and decreasing filter life. This situation also results in decreased filtration capacity due to a continuing need to deactivate and clean the filter system. As a result, the volume of fluid materials to be treated within a given time period is minimized. Problems of this nature typically occur in a wide variety of situations involving many types of liquid or slurry materials including but not limited to yeast slurries and beer test samples in the brewing industry, petroleum products, dairy by-products, medical compositions and the like.

The present invention represents a unique, self-cleaning fluid treatment system which is characterized by a high degree of operating efficiency. The invention specifically involves a specialized filtration apparatus having a self-contained claiming system which enables the removal of solid materials from liquids having a high concentration of suspended solids. Also, large volumes of liquid materials may be filtered in a minimal amount of time. These goals are accomplished while avoiding the problems listed above, including premature blockage of the filtration media with solid materials. The present invention therefore represents an advance in the art of high efficiency filtration.

Aside from the filtration of fluid materials, another important function encompassed within the term "fluid treatment" as used herein involves the injection and dissolution of gaseous materials into liquids. For example, in the production of beverage products (e.g. beer, ales, sweetened soft drinks, non-beer alcohol-containing malt beverage compositions and the like), it is often necessary to carbonate such materials with gaseous $CO_2$ to produce beverage products with desired taste characteristics. Other situations which involve the dissolution of gaseous materials into fluids include but are not limited to (1) the introduction of $O_2$ into compositions used to produce fermented food/beverage materials (e.g. the infusion of $O_2$ into "wort" used in beer production); (2) the introduction of air or $O_2$ into waste materials (e.g. sewage) for aerobic digestion within waste treatment plants; (3) the introduction of ozone ($O_3$) into water materials for the purification thereof (e.g. the destruction of microorganisms); and (4) the infusion of air or $O_2$ into water used to support fish and other aquatic life forms. In this regard, the present invention shall not limited to any applications or materials which are used to produce a gas-containing liquid product as discussed below.

A need currently exists for a high-efficiency gas introduction system in which gases are placed in intimate contact with a selected fluid to achieve complete gas dissolution within the fluid. This need is especially important in the beverage industry where rapid gas introduction/dissolution is required with a minimal amount of system down-time needed to perform cleaning and other maintenance activities. For example, during the processing and carbonation of beverage materials (e.g. beer) suspended organic solids and other related compositions can result in the production of a "bio-film" layer (comprised of organic film-forming compositions) on conventional stationary carbonation equipment, thereby causing cloggage and a reduction in operating efficiency. The present invention solves these problems and enables the rapid and efficient delivery of gaseous materials in a manner which (1) avoids the build-up of extraneous solids on system components; (2) enables the diffusion of gaseous materials within a selected fluid in a rapid and evenly-distributed manner; and (3) creates a high degree of fluid turbulence in the system which facilitates the introduction and dissolution of large quantities of gaseous materials into a selected fluid in a minimal amount of time. Accordingly, the present invention represents an advance in the art of fluid treatment in that it not only enables fluids to be filtered in a highly efficient manner, but likewise facilitates the dissolution of gaseous materials within fluids depending on the operating mode of the system. In this regard, the invention represents a true multi-function fluid treatment system of novel design and capabilities as discussed below.

SUMMARY OF THE INVENTION

It is an object of the present invention to provide a multi-function fluid treatment system of improved efficiency and operating capacity.

It is another object of the invention to provide a multi-function fluid treatment system which is capable of filtering solids from fluid materials having a high suspended solids content.

It is another object of the invention to provide a multi-function fluid treatment system which is not only capable of filtering solids from fluids in a highly efficient manner, but (when operated in a different mode) can uniformly distribute and dissolve gaseous materials within a selected fluid in a minimal amount of time.

It is another object of the invention to provide a multi-function fluid treatment system having the dual capabilities described above which incorporates a self-cleaning function, thereby minimizing system down-time.

It is a further object of the invention to provide a multi-function fluid treatment system having the dual capabilities described above which uses a minimal number of operating components.

It is a still further object of the invention to provide a multi-function fluid treatment system having the dual capabilities described above wherein the components of the system are highly durable and characterized by a long life span.

It is an even further object of the invention to provide a multi-function fluid treatment system having the dual capabilities described above wherein multiple cartridge units in close proximity with each other are used in connection with a drive system for simultaneously rotating all of the cartridges, with the simultaneous rotation of such cartridges and the close proximity of the cartridges to each other resulting in (1) an enhanced degree of filtration capacity when the system is used in a fluid filtration mode; and (2) the ability to diffuse and dissolve large amounts of gas materials into a selected fluid when the system is used in a gas diffusion mode.

It is an even further object of the invention to provide a multi-function fluid treatment system which further includes an internal cleaning (wiping) assembly in direct contact with the multiple cartridge units for removing accumulated solid wastes (debris) from the cartridge units during rotation.

It is an even further object of the invention to provide methods for fluid filtration, self-cleaning, and the diffusion of gas materials into a selected fluid which are accomplished using the multi-function fluid treatment system described herein.

In accordance with the foregoing objects, the present invention involves a unique and efficient multi-function fluid treatment system for (1) separating solid materials from liquids and slurries; and (2) dissolving gaseous materials into a selected liquid. Accordingly, the term "fluid treatment" as used herein shall encompass both of these goals, with the claimed system using substantially the same components to accomplish both goals. The invention may be used in connection with a wide variety of materials, and shall not be limited to the fluid treatment of any particular compositions. As discussed below, when the claimed system is used in a "filtration mode", the system is characterized by a high degree of separation efficiency with the ability to filter large amounts of fluid materials in a given time period. When the system is operated in a "gas diffusion" mode, it produces a high degree of fluid turbulence which enables large amounts of gas materials to be dissolved in the selected fluid over a minimal time period. In addition, the fluid treatment system of the present invention has a self-cleaning capability in both the filtration and gas diffusion modes which likewise enhances the operating efficiency of the system while reducing down-time. These multiple goals and capabilities are all accomplished using a specialized arrangement of components which are configured in a unique manner as discussed below.

Use of the fluid treatment system for filtration purposes will now be discussed. The system specifically includes a primary housing having at least one inlet port therein. Positioned within the primary housing is a plurality of elongate filter cartridge units. The filter cartridge units are located directly adjacent each other and preferably oriented in a vertical position within the housing. It is preferred that, within the housing, any one of the filter cartridge units is separated from adjacent cartridge units by a distance not less than about 0.1 inch. This distance is sufficient to create a high degree of fluid turbulence between and around the cartridge units which correspondingly increases filtration capacity and prevents the collection of packed solid materials on the exterior surface of each cartridge unit.

The present invention shall not be limited regarding the number of filter cartridge units being used. However, in a preferred embodiment, three cartridge units are vertically positioned within the housing in a triangular arrangement wherein each of the cartridge units are spaced equidistantly from each other by a distance not less than about 0.1 inch.

Each cartridge unit includes a longitudinal axis, an open upper end, a closed lower end, and a tubular side wall portion. The side wall portion is constructed of a selected porous, fluid-permeable filter material. In an optimum and preferred embodiment, the filter material will consist of sintered stainless steel, although other filter materials known in the art and suitable for the purposes set forth herein may likewise be used. Each cartridge unit further includes an interior region therein surrounded entirely by the tubular side wall portion which is adapted to receive fluids which pass through the filter material used to construct the side wall portion. So that collected fluids may ultimately leave the interior region, each cartridge unit further includes an outlet or opening at the upper end thereof.

In a specific and preferred embodiment of the invention, each of the filter cartridge units includes a rigid, durable core member positioned within the interior region thereof. The core member preferably includes a medial section having a first end, a second end, an upper cap member secured to the first end, and a lower cap member secured to the second end. The upper cap member has an elongate opening which passes partially through the upper cap member in a downward direction. The upper cap member further includes a longitudinal bore therethrough which is in fluid communication with the elongate opening in the upper cap member and substantially perpendicular thereto.

The tubular side wall portion of each cartridge unit likewise includes an upper end and a lower end. In a preferred embodiment, the upper cap member described above is fixedly secured to the upper end of the side wall portion. Likewise, the lower cap member is fixedly secured to the lower end of the side wall portion. In this configuration, the medial portion of the core member is positioned entirely within the interior region of the selected cartridge unit. Because the diameter of the medial portion is less than the diameter of the interior region of each cartridge unit, the medial portion is surrounded by and spaced inwardly from the side wall portion to form a fluid flow passageway therebetween. As described below, this arrangement of components enables fluids which pass through the side wall portion to travel through the fluid flow passageway, pass through the longitudinal bore in the upper cap member of the core member, and out of the core member through the elongate opening in the upper cap member. In this manner, the filtered fluid is able to pass outwardly from each cartridge unit for collection as described below. While this type of cartridge design is preferred in connection with the present invention, other cartridge units of differing design may also be used. Accordingly, the fluid treatment system described herein shall not be limited to any specific type of filter cartridge unit or comparable structure.

In a preferred embodiment of the invention, the primary housing also includes a cartridge unit support member therein which comprises a planar upper surface having a plurality of openings therein. Each of the openings extends partially through the cartridge unit support member and further includes a biasing member (preferably in the form of a spring) which is inserted entirely within each opening. Positioned on top of each biasing member is a bearing member having an upper surface and a lower surface. The lower surface of each bearing member rests on the biasing member, while the lower end of one of the cartridge units is positioned on the upper surface of the bearing member. In this configuration, the lower end of each cartridge unit rests on one of the bearing members so that the cartridge unit may freely rotate relative to the cartridge unit support member in a "free-floating" manner. It should also be noted that the cartridge unit support member includes multiple drainage bores therein as described below.

Each of the filter cartridge units is operatively connected to drive means which rotates the cartridge units during operation of the fluid treatment system. To connect the cartridge units to the drive means, a tubular shaft member is attached to each cartridge unit. Each shaft member includes an open first end, a closed second end, and a medial portion therebetween. The medial portion includes a tubular outer wall and an internal passageway surrounded by the outer wall. The outer wall further includes at least one port through the medial portion of the shaft member between the first end and the second end which provides access to the internal passageway. The first end of each shaft member is operatively connected to and terminates at the open upper end of one of the cartridge units. In a preferred embodiment wherein each cartridge unit includes a core member with upper and lower cap members, the first end of each shaft member is operatively connected to and terminates at the upper cap member of a selected cartridge unit and positioned within the elongate opening therein. In this manner, fluid materials leaving each cartridge unit pass into and through the internal passageway of the shaft member associated therewith. The second end of each shaft member is operatively connected to the drive means as described below.

In an optimum and preferred embodiment of the invention, a secondary housing is provided which is attached to and positioned on top of the primary housing. The secondary housing includes a longitudinal axis and a plurality of main bores therethrough, with each main bore being parallel to the longitudinal axis. Each of the main bores is sized to receive the medial portion of one of the shaft members. Specifically, the diameter of each main bore is greater than the diameter of the respective shaft member positioned therein so that the shaft member is freely rotatable within its respective bore. It should also be noted that each of the shaft members is preferably of sufficient length so that the second end extends outwardly from and above the secondary housing, with the first end extending outwardly from and below the secondary housing.

In a preferred embodiment, the secondary housing further includes a plurality of fluid delivery passageways therethrough, with each passageway being perpendicular to the longitudinal axis of the secondary housing and extending radially inward through the secondary housing to the center thereof. Each fluid delivery passageway includes a first end and a second end. The first end of each fluid delivery passageway terminates at the external surface of the secondary housing, and is blocked using a plug member inserted therein. The second end of each fluid delivery passageway extends inwardly and terminates at a position remotely spaced from the main bores. In a preferred embodiment, the second ends of the fluid delivery passageways converge at the center of the secondary housing. At this position, they are placed in fluid communication with a fluid collection bore which extends upwardly within the secondary housing. The fluid collection bore is substantially parallel to the longitudinal axis of the secondary housing, and is remotely spaced from the main bores having the shaft members therein. In addition, the fluid collection bore is ultimately connected to an external fluid collection conduit which leads out of the secondary housing. Using this arrangement of components, fluids passing outwardly from each cartridge unit flow through the shaft member associated therewith. The fluids thereafter exit each shaft member through the port in the medial portion thereof, pass into each main bore through the secondary housing, and thereafter pass into the fluid delivery passageways. As a result, fluid materials within the fluid delivery passageways are directed out of the secondary housing though the fluid collection bore and the external fluid collection conduit.

The drive means associated with the fluid treatment system is an integral and important part of the present invention. In a preferred embodiment, the drive means consists of multiple annular pulley members, with each pulley member being connected to the second end of one of the shaft members. Connection in this manner is facilitated since the second end of each shaft member extends above and outwardly from the secondary housing of the fluid treatment system. A continuous belt is operatively connected to and in simultaneous engagement with all of the pulley members. The belt is also operatively connected to a motor unit designed to move the belt and each of the pulley members. In this manner, all of the cartridge units are simultaneously rotated by the drive means at the same speed.

In a preferred embodiment, the belt may be positioned on the pulley members in an orientation which enables all of the pulley members (and cartridge units associated therewith) to rotate in the same direction. Alternatively, the belt may be positioned on the pulley members in a serpentine configuration wherein one portion of the belt is positioned between one or more of the pulley members and the rest of the belt is positioned around the remaining pulley members. This configuration enables one or more of the pulley members to rotate in one direction, with the remaining pulley members rotating in the opposite direction. In certain applications involving the treatment of specific fluids, this alternative configuration will create additional fluid turbulence and enhanced operating capacity as described below.

Operation of the system described herein results in superior filtration efficiency. This is especially true regarding fluids having a high suspended solids content. In order to use the fluid treatment system of the present invention, a selected liquid having suspended solids therein is routed into the inlet port of the primary housing so that the fluid is placed in physical contact with and around all of the filter cartridge units in the primary housing. Next, the drive means (e.g. the motor unit) is activated to cause movement of the belt and pulley members connected thereto. Movement of the pulley members causes corresponding simultaneous rotational movement of the shaft members and the filter cartridge units attached to the shaft members. As a result, the filter cartridge units rapidly spin within the primary housing in a closely adjacent relationship. Depending on the manner in which the belt is positioned on the pulley members, the filter cartridge units will either rotate in the same direction or at least one cartridge unit will rotate in one direction (a first direction) with the remaining cartridge units rotating in an opposite direction (a second direction). The directional characteristics of the filter cartridge units will vary, based on the specific materials being filtered and the solids content thereof, with the selection of any particular configuration being determined in accordance with preliminary pilot tests on the fluids being treated. Regardless of the directional characteristics of the filter cartridge units, they will all rotate at the same speed (e.g. about 500–4000 rpm [2500 rpm= optimum] in a preferred embodiment).

Rotation of the filter cartridge units in combination with the close proximity of the cartridge units to each other will create a considerable degree of fluid agitation/turbulence around and between the units. This agitation greatly enhances the filtration capacity of the system compared with systems which involve single cartridge units. Fluid agitation between and around the filter cartridge units creates a "self-cleaning" function wherein solid materials which collect on the exterior surface of each cartridge unit are effectively scrubbed therefrom. As a result, the need to constantly deactivate the system for cleaning is minimized. In addition, the enhanced degree of agitation and rapid fluid motion around and between the filter cartridge units increases fluid pressure levels within the primary housing, thereby accelerating the entry of fluid materials into the cartridge units. Accordingly, filtration speed is increased which correspondingly increases the amount of fluid materials which may be treated using the system of the present invention. All of these benefits are achieved to an even greater degree if a triangular arrangement of filter cartridge units is used. This particular arrangement provides an especially high degree of fluid agitation, especially within the open center zone between all of the rotating cartridge units. The enhanced degree of fluid turbulence within the open center zone correspondingly generates strong fluid currents and fluid agitation in other portions of the system which even further improves filtration efficiency. Additional benefits achieved in accordance with the invention will be described in greater detail below.

As the fluids come in contact with the side wall portion of each filter cartridge unit (which is comprised of filter materials), they will pass therethrough with any solid materials being prevented from passing into the cartridge units. In this manner, the solid materials will remain in the primary housing for subsequent collection or disposal. In accordance with a preferred embodiment of the invention as described above, fluids within the side wall portion of each cartridge unit enter the passageway between the side wall portion and the core member, with the fluids thereafter flowing through the longitudinal bore and elongate opening in the upper cap member. Fluid flow in this manner occurs because the longitudinal bore and elongate opening in the upper cap member are in fluid communication with the fluid flow passageway between the side wall portion and the core member as discussed below. The filtered fluids then leave each cartridge unit and flow through the tubular shaft member associated therewith. The fluids thereafter leave each shaft member through the port in the outer wall thereof, pass into the fluid delivery passageways within the secondary housing, and ultimately enter the fluid collection bore as described above. Fluids within the fluid collection bore (which came from the interior region of each cartridge unit) are then routed through the external fluid collection conduit, and collected in a suitable storage vessel, container, or the like (depending on whether the collected fluids are to be retained or discarded). It should be noted that the fluid collection process takes place in a continuous manner while the fluid treatment system is operating (e.g. while the filter cartridge units are rotating within the primary housing). Likewise, the fluid collection process described herein may be varied as necessary in accordance with the specific structural configuration of the cartridge units being used.

In a still further embodiment of the fluid treatment system which is particularly useful for filtering liquids having a high level of suspended solids, a plurality of flexible, outwardly-extending wiping members are secured to and within the primary housing so that they remain stationary during system operation. The wiping members are used to provide additional self-cleaning capabilities in addition to the scrubbing action provided by the multiple rotating cartridge units described above. The side wall portion of each filter cartridge unit is positioned (placed) against and in direct contact with at least one of the wiping members. The wiping members are designed to remove collected debris from the side wall portion of each cartridge unit during rotation thereof. As discussed in further detail below, the wiping members may each be constructed from many different materials including plastic, rubber, fabric, and natural animal fiber materials (e.g. animal fur or hair). The present invention shall not be limited to any particular construction materials for this purpose. The claimed wiping members and components associated therewith are used in connection with all of the other elements of the fluid treatment system described above unless otherwise indicated.

As previously noted, the wiping members are secured to and within the primary housing in a fixed position. In a preferred embodiment, the claimed fluid treatment system further includes an elongate vertical support member secured to and within the primary housing adjacent the filter cartridge units. The outwardly-extending wiping members are securely attached to the support member. To properly clean the cartridge units, the vertical support member is mounted within the housing so that the side wall portion of each cartridge unit is positioned against and in direct physical contact with at least one of the wiping members. In a representative and preferred embodiment, the wiping members attached to the vertical support member will consist of a plurality of flexible elongate bristles extending outwardly from the support member. The term "bristle" as used herein shall involve an elongate, filamentous member having a flexible, hair-like character. The bristles may again be made from plastic, rubber, fabric, and natural animal fiber materials (e.g. animal fur or hair). To effectively attach the bristles to the vertical support member, the support member will preferably include a first elongate support wire and a second elongate support wire which are twisted together with the bristles engaged therebetween so that the bristles extend outwardly from the support member.

A preferred filtration system produced in accordance with the claimed invention involves three individual elongate filter cartridge units positioned within the primary housing in a triangular arrangement. In accordance with this arrangement, each of the cartridge units is spaced equidistantly from each other to form an open center zone surrounded by the cartridge units. To effectively clean the cartridge units in this arrangement, the elongate vertical support member is oriented within the open center zone so that each of the cartridge units is placed against and in direct physical contact with at least one of the wiping members on the support member. Optimum results are achieved if the vertical support member is spaced equidistantly from each of the filter cartridge units within the open center zone. When a vertical support member is used which includes first and second support wires twisted together with a plurality of bristles therebetween as discussed above, the support member is again oriented within the open center zone so that it is spaced equidistantly from each of the cartridge units. In this orientation, the side wall portion of each cartridge unit is positioned against and in direct physical contact with at least one of the bristles on the support member.

The present invention shall not be limited to any particular arrangement or organization of wiping members on the vertical support member. Many different wiping member configurations and arrangements may be used within the scope of the claimed invention. An alternative wiping system involves the use of multiple outwardly-extending wiping members arranged on the support member in a plurality of separate vertical rows spaced apart from each other on the support member. In this configuration, the support member is oriented within the housing so that each row of wiping members is positioned against and in direct contact with the side wall portion of one of the cartridge units. As a result, the wiping members can effectively remove collected debris from the side wall portions of the filter cartridge units during system operation.

When this embodiment of the claimed invention is employed, the plurality of flexible, outwardly-extending wiping members may again be constructed from many different materials including plastic, rubber, fabric, and natural animal fiber materials (e.g. animal fur or hair). To achieve optimum results, the plurality of flexible, wiping members in this embodiment will likewise consist of multiple bristles as discussed and defined above. Many different methods may be used to secure the individual rows of wiping members (bristles) to the vertical support member, with the present invention not being limited to any specific arrangement of components for this purpose. However, in a preferred embodiment, a plurality of elongate channel members are secured to the support member, with each of the channel members including an upper (first) end, a lower (second) end, a first side panel, and a second side panel. The first side panel is spaced apart from the second side panel to form a gap therebetween. The first side panel also includes an outer longitudinal edge having a ridge portion thereon which extends inwardly into the gap. Likewise, the second side panel includes an outer longitudinal edge having a ridge portion extending inwardly into the gap. In accordance with this design, the ridge portion on the first side panel directly faces the ridge portion on the second side panel so that both of the ridge portions are on opposite sides of the gap.

Slidably positioned within each channel member is an elongate brush assembly. Each brush assembly comprises a longitudinal retaining strip having a plurality of wiping members (e.g. bristles) secured to the strip and extending outwardly therefrom. As a result, each brush assembly forms one of the individual rows of wiping members (bristles) described above. To secure the brush assemblies in position on the vertical support member, each of the brush assemblies is placed within the gap of a selected channel member and retained therein by abutting engagement of the retaining strip against the ridge portion on the first side panel and the ridge portion on the second side panel. As a result, the brush assemblies will not experience outward (forward) movement from the gaps in the channel members during system operation. Each brush assembly is slidably introduced into its respective channel member through the first end thereof. To prevent each brush assembly from sliding out of its designated channel member through the second end, the first side panel and the second side panel of each channel member are tilted inwardly toward each other at the second end to prevent premature brush assembly displacement through the second end. As a result, a unique wiping system is created which includes multiple rows of wiping members that are capable of (1) effective removal of collected solid debris from the side wall portions of the cartridge units; and (2) rapid removal and replacement of the brush assemblies from the channel members attached to the vertical support member.

In accordance with the information provided above, a preferred filtration system again involves the use of three individual elongate filter cartridge units positioned within the primary housing in a triangular arrangement. Each of the cartridge units in this arrangement is spaced equidistantly from each other to form an open center zone surrounded by the cartridge units. The alternative cleaning system described above (which uses a plurality of wiping members arranged in multiple rows) may likewise be used to clean the cartridge units when configured in a triangular arrangement. To accomplish this goal, the elongate vertical support member (which is secured to and within the primary housing) is again positioned in the open center zone surrounded by the filter cartridge units. As previously discussed, the vertical support member includes a plurality of flexible, outwardly extending wiping members attached thereto which are arranged in separate rows (one row for each cartridge unit in a preferred embodiment). In the triangular arrangement of cartridge units described above, three separate vertical rows of wiping members (e.g. bristles) will be used on the support member, with each of the rows being spaced equidistantly from each other thereon. To clean the cartridge units in accordance with the present invention, the support member is oriented within the open center zone so that each row of wiping members is positioned against and in direct physical contact with the side wall portion of a selected cartridge unit. Regarding the use of multiple channel members on the support member having elongate brush assemblies positioned therein as described above, these components are equally applicable to the claimed triangular arrangement of cartridge units and any other embodiments having different numbers of cartridge units. In a preferred embodiment, one brush assembly will be provided for each cartridge unit regardless of the number of cartridge units used in the system.

In use, the claimed fluid treatment system having multiple wiping members positioned in the primary housing is operated in the same manner described above in connection with the primary embodiment of the present invention. Specifically, a fluid material (e.g. a liquid or gas) having solid materials suspended therein is placed in contact with and around all of the filter cartridge units in the housing. Each of the cartridge units is then rotated around its respective longitudinal axis in a simultaneous manner using the drive means to create fluid turbulence around and between the units. Fluid turbulence created by the multiple rotating cartridge units enhances the operating efficiency of the entire system. During treatment, fluid materials will pass through the side wall portion of each cartridge unit and into the interior region thereof while preventing passage of the solid materials.

As previously indicated, the filtration system is provided with a plurality of wiping members secured to and within the primary housing. Attachment of the wiping members within the housing is discussed in detail above. In general, the wiping members (which preferably involve multiple bristles) are secured to a vertical support member which is again mounted inside the housing adjacent the cartridge units so that the wiping members are positioned against and in direct physical contact with the side wall portions of the cartridge units. As noted above, the claimed wiping system may involve: (1) the use of a vertical support member consisting of first and second elongate support wires twisted together with a plurality of bristles therebetween; or (2) a system which uses multiple wiping members (e.g. bristles) arranged in individual rows or brush assemblies that are slidably mounted within channel members secured to the vertical support member.

The next step in the fluid treatment process involves wiping the side wall portion of each filter cartridge unit with at least one of the wiping members during rotation of the cartridge units to remove any collected debris therefrom. As a result, the side wall portions of the cartridge units are cleaned and maintained in an "unblocked" state so that filtration can occur with a maximum degree of efficiency and minimum system maintenance requirements. Finally, the filtered fluid retained within the interior region of each filter cartridge unit is collected as discussed above.

In a preferred embodiment using three individual filter cartridge units positioned within the housing in a triangular arrangement, the wiping members are placed in the open center zone surrounded by the cartridge units. Specifically, the vertical support member and attached wiping members are secured to and within the housing inside the open center zone surrounded by the cartridge units. The support member is placed at a location within the open center zone so that the side wall portion of each filter cartridge unit is positioned against and in direct physical contact with at least one of the wiping members. The wiping members can then remove any collected debris from the side wall portions of the cartridge units during system operation. A high level of cleaning efficiency is accomplished in this embodiment by the unique level of turbulence which occurs within the open center zone (discussed further below). This turbulence further assists the wiping members in dislodging collected debris from the cartridge units. Specifically, the high turbulence level within the open center zone and the physical wiping action of the wiping members synergistically cooperate to substantially improve cleaning efficiency.

An even further embodiment of the claimed invention involves use of the fluid treatment system in a gas diffusion mode. In this mode, a number of different steps are taken. However, the structural components, elements, and mechanical features of the system will remain substantially the same regardless of whether the system is used in a filtration mode or fluid treatment mode with certain exceptions. Regarding these exceptions, the system will include a gas storage container having a supply of at least one gas therein to be diffused/dissolved within the selected liquid. The present invention shall not be limited exclusively to the use of any particular gas compositions, with the specific gas to be used depending on the particular gas-containing liquid which is desired as the final product. Exemplary gas materials suitable for use in this embodiment of the invention will include but not be limited to $O_2$, $CO_2$, $N_2$, $O_3$, air, and mixtures thereof.

For the purposes of this embodiment, the primary and second housings described above shall collectively constitute a fluid containment chamber which (as discussed below) includes at least one inlet port therein. The gas storage container having the selected gas therein is operatively connected to and in fluid communication with the inlet port in the fluid containment chamber. As a result, gas materials from the gas storage container can flow into the fluid containment chamber and cartridge units in a highly efficient manner.

In a preferred embodiment, the gas materials will be introduced into the system (e.g. the interior regions of the cartridge units) at a flow rate of about 13–15 $ft^3$/min. However, the precise flow rate to be employed will vary, depending on the specific gas and fluid materials selected for use within the system. The individual cartridge units used for gas delivery to the selected fluid will be of the same type and structure described above. Each cartridge unit will include a longitudinal axis, an upper end, a lower end, a tubular side wall portion comprised of a porous, gas-permeable material, and an interior region surrounded by the side wall. In a preferred embodiment, the porous, gas-permeable material will involve the same materials described in the first embodiment of the invention which were used for filtration (e.g. sintered stainless steel). However, other materials may also be used for this purpose as discussed below. The system will use a plurality of cartridge units (e.g. two or more), with a preferred embodiment involving three cartridge units positioned equidistantly from each other in a triangular arrangement. In addition, each of the cartridge units is preferably positioned in a vertical orientation, although certain applications may permit horizontal orientation of the cartridge units as determined by preliminary pilot testing. Each of the cartridge units is designed to rotate around its longitudinal axis using drive means as discussed below. In addition, each cartridge unit further includes an outlet in the upper end thereof. The outlet of each cartridge unit is in fluid communication with the inlet port in the fluid containment chamber. As a result, gas from the gas storage container can flow into the inlet port of the fluid containment chamber and into the outlet at the upper end of each cartridge unit. Thereafter, the gas will flow into the interior region of each rotating cartridge unit and pass through the side wall portion thereof for distribution within the system. The specific flow path of the gas within the system uses the same bores/conduits described above which are used to deliver filtered fluids out of each cartridge unit in the first embodiment of the invention. In the filtration mode of the system, filtered fluids pass upwardly through a series of bores and passageways within each cartridge unit, through the tubular shaft member associated with each cartridge unit, and into the secondary housing for delivery outside of the system. In a comparable manner, gas materials entering the system follow the same flow path, but in the opposite direction (e.g. toward the cartridge units compared with the first embodiment in which filtered fluid materials travel away from the cartridge units.) A more detailed discussion regarding the flow path taken by the gas materials within the system will be provided below, although it is a key feature of the present invention that the gas storage container is in fluid communication with the open upper end of each cartridge unit as also discussed below.

The remaining components and features of the system used to generate a gas-containing liquid product are the same as those previously discussed in the first embodiment of the invention used for filtration purposes (including the particular drive means, the tubular shaft members associated with each cartridge unit, the cartridge unit support member, and the biasing/bearing system associated with the support member).

To produce a gas-containing liquid product in accordance with the invention, a selected fluid is initially placed within the fluid containment chamber so that the fluid comes in contact with and surrounds all of the cartridge units. Many different types of fluid materials may be treated with the selected gas to achieve gas diffusion. In this regard, the present invention shall not be limited to the treatment of any particular fluid materials for this purpose. Exemplary fluids to be treated in accordance with the invention will involve alcohol-containing beverage compositions including but not limited to beer, ales, and non-beer malt beverages of the type disclosed in U.S. Pat. No. 5,294,450 to Word et al., as well as sweetened soft drink materials. These compositions are typically combined with gaseous carbon dioxide to produce carbonated beverage products. Other fluid materials suitable for use in this embodiment of the invention are listed below. Thereafter, the selected gas from the storage container is introduced into the system, preferably at a flow rate within the range listed above. Because the gas storage container is in fluid communication with the open upper end of each cartridge unit as previously discussed, the gas is able to flow into the interior region of each cartridge unit. As a result, the selected gas is introduced into the interior region of each of the cartridge units in a rapid and effective manner.

During introduction of the gas into the system as indicated above, each of the cartridge units is simultaneously rotated around its respective longitudinal axis using the foregoing drive means. In a preferred embodiment, the cartridge units will all rotate at the same speed (e.g. about 500–4000 rpm [2500 rpm=optimum]) and in the same direction. As a result, the gas diffuses through the side wall portion of each cartridge unit during cartridge rotation in order to rapidly and efficiently disperse the gas into and through the selected fluid within the system. This process generates a liquid product having the selected gas dissolved therein, with simultaneous gas delivery and cartridge rotation providing numerous benefits. For example, rotational movement of the cartridge units during gas delivery creates considerable turbulence and fluid agitation around and between each cartridge unit. This agitation greatly enhances the physical integration and dissolution of delivered gases into the selected fluid within the system. Accordingly, an environment is created in which the molecular bonding and surface tension values of the gas and fluid materials within the system are favorably altered to facilitate the gas diffusion process. As a result, a substantial amount of gas can be dissolved within the selected fluid over a minimal time period compared with gas diffusion systems involving stationary (non-rotational) components.

Fluid agitation around and between the cartridge units also creates a "self-cleaning" function as described above in which extraneous solids in the fluids are prevented from adhering to the exterior surface of each cartridge unit. In this manner, extraneous solid compositions are effectively scrubbed from each cartridge unit. As a result, the consistent, uninterrupted delivery of gaseous materials through the cartridge units is ensured, without the need to repeatedly deactivate the system for cleaning. All of these benefits are achieved in a highly efficient manner if a triangular arrangement of cartridge units is used wherein each of the cartridge units is spaced equidistantly from each other by a distance not less than about 0.1 inch. This particular arrangement provides an enhanced degree of fluid agitation, especially within the center zone between all of the rotating cartridge units. The enhanced degree of fluid turbulence within the center zone correspondingly generates strong fluid currents and agitation in other portions of the system, thereby resulting in enhanced gas diffusion and self-cleaning capabilities. Additional benefits achieved in accordance with the invention will be described in further detail below.

The present invention represents an advance in the art of fluid treatment. The fluid treatment system described herein is characterized by multiple capabilities. When operated in a filtration mode, the claimed system provides an improved degree of separation efficiency, with significant amounts of fluid being treatable in a given time period. Use of the wiping members and related components provides an additional improvement in operating efficiency which reduces system maintenance requirements. When the system is operated in a gas diffusion mode, it enables a maximum quantity of gas to be distributed within the selected fluid in a minimal amount of time. These and other objects, features, and advantages of the invention will now be described in the following Brief Description of the Drawings and Detailed Description of Preferred Embodiments.

BRIEF DESCRIPTION OF THE DRAWINGS

FIG. 16 is a side elevational, partially-exploded view of an alternative cartridge wiping assembly suitable for use in the multi-cartridge fluid treatment system of FIG. 1.

FIG. 17 is an enlarged cross-sectional view of the alternative cartridge wiping assembly of FIG. 16 illustrating the channel members, brush assemblies, and associated components.

FIG. 18 is a schematic perspective view of the alternative cartridge wiping assembly of FIG. 16 surrounded by a plurality of filter cartridge units in a triangular arrangement.

DETAILED DESCRIPTION OF PREFERRED EMBODIMENTS

As described above, the present invention involves a unique and effective multi-function fluid treatment system which is characterized by the ability to (1) remove solid materials from liquids in a highly efficient manner; and (2) dissolve one or more gaseous materials into a selected fluid, depending on the mode in which the fluid treatment system is operated. To accomplish these goals, the system uses a plurality of rotating cylindrical cartridge units in close proximity with each other. As discussed below, each cartridge unit includes a side wall portion comprised of porous material capable of filtration and, in the alternative, gas diffusion therethrough. The use of multiple rotating cartridge units in close proximity with each other enhances the filtration capacity and/or gas diffusion capability of the entire system due to fluid turbulence created between and around the cartridge units. The phrase "fluid treatment" as used herein shall encompass both filtration processes and gas dissolution procedures which are both accomplished in a highly efficient manner. To clearly explain the dual capabilities of the present invention, it shall be described below with reference to a "filtration mode" and a "gas diffusion mode". Furthermore, in an additional embodiment of the present invention, the claimed fluid treatment system will include a specialized cleaning system which uses a plurality of wiping members to remove collected debris from the filter cartridge units during filtration of a selected fluid. This embodiment and its various features, components, and elements will be further discussed below in the section entitled "enhanced cleaning mode".

A. Filtration Mode

Figure 1:
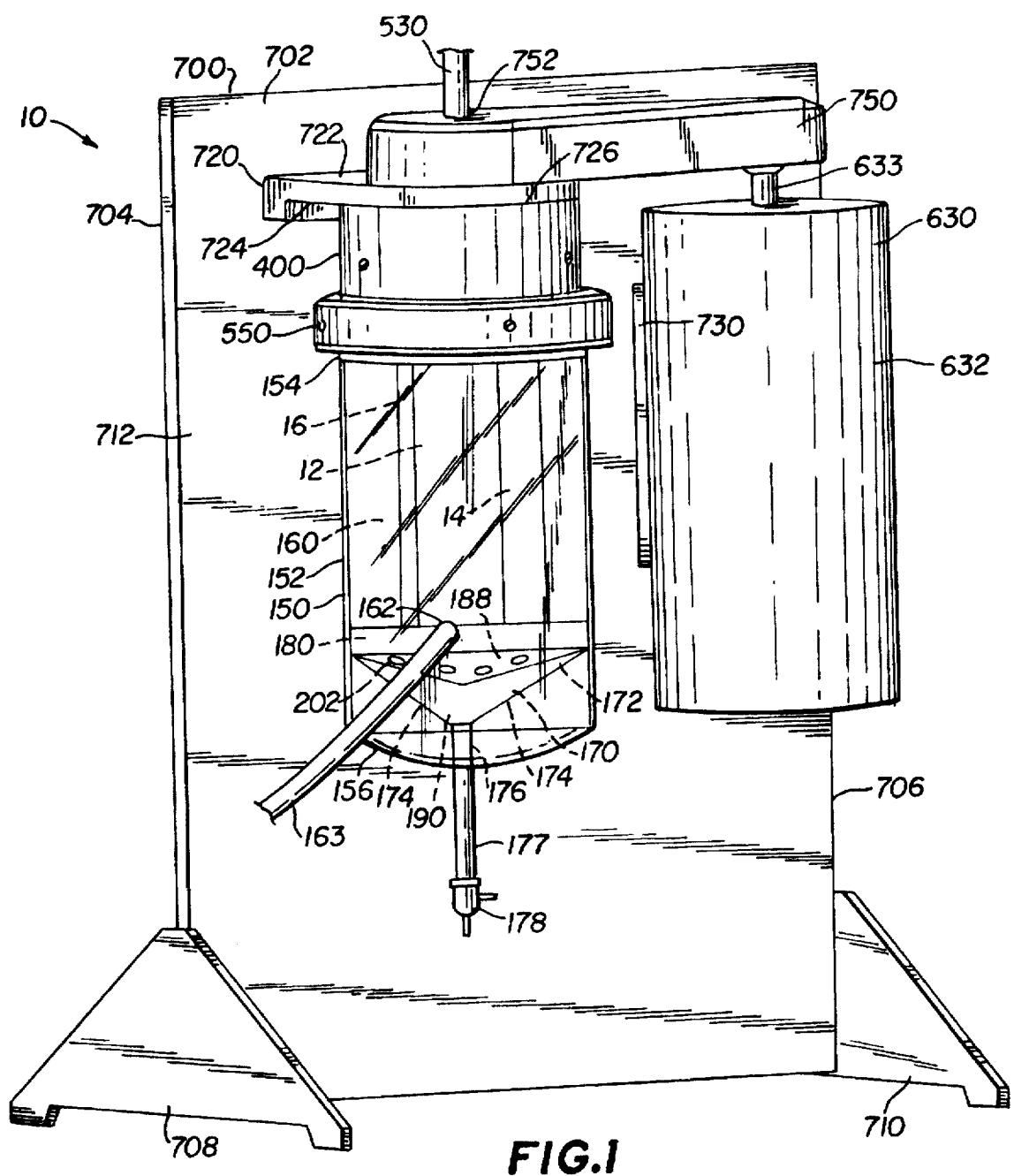
FIG. 1 is a front perspective view of a multi-cartridge fluid treatment system produced in accordance with the present invention which is used for the filtration of solid materials from fluids.
Figure 2:
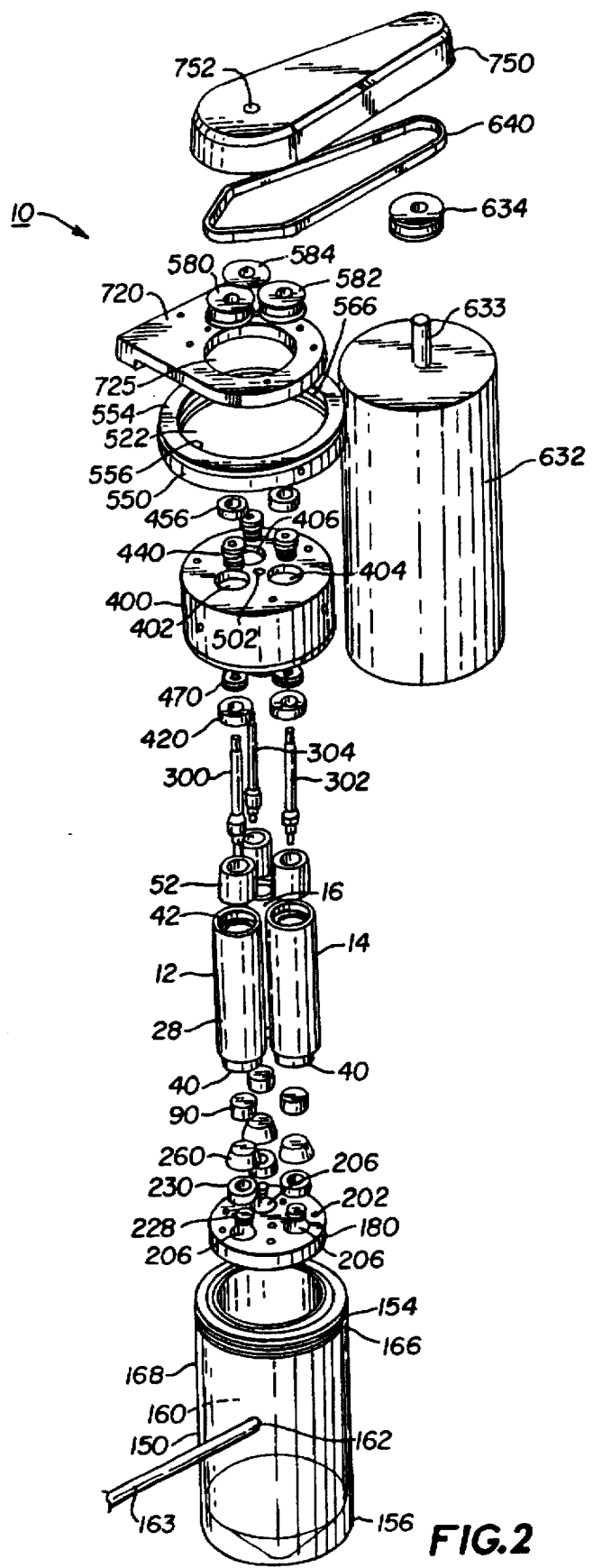
FIG. 2 is an exploded perspective view of the fluid treatment system of FIG. 1 partially illustrating the drive means, primary housing, secondary housing, filter cartridge units, and components associated therewith.

With reference to FIGS. 1–2, the multi-cartridge fluid treatment system of the present invention as used to filter solid materials from fluids is generally designated at reference number 10. While the system 10 will be primarily discussed with reference to the removal of solid materials from liquids, the term "fluid" as used herein shall also encompass gaseous materials in addition to liquids. In this regard, the claimed system as described below can be used in the same manner to (1) remove solid materials from liquids; and (2) remove solid particles and the like (e.g. dust particles) from gases introduced into the system.

Each of the various components of the system 10 will be described individually below. First, representative rotatable filter cartridge units 12, 14, 16 which are suitable for use with the fluid treatment system 10 are illustrated in FIG. 2. Each of the filter cartridge units 12, 14, 16 is identical in structure, function, design, and capability. While the fluid treatment system 10 as described herein is illustrated in connection with three separate filter cartridge units 12, 14, 16, the present invention shall not be limited to this specific number of units. In particular, the fluid treatment system 10 may be used in connection with two or more rotatable filter cartridge units, with the ultimate number of cartridge units depending on the size and environment in which the system 10 is to be used.

Figures 3, 4:
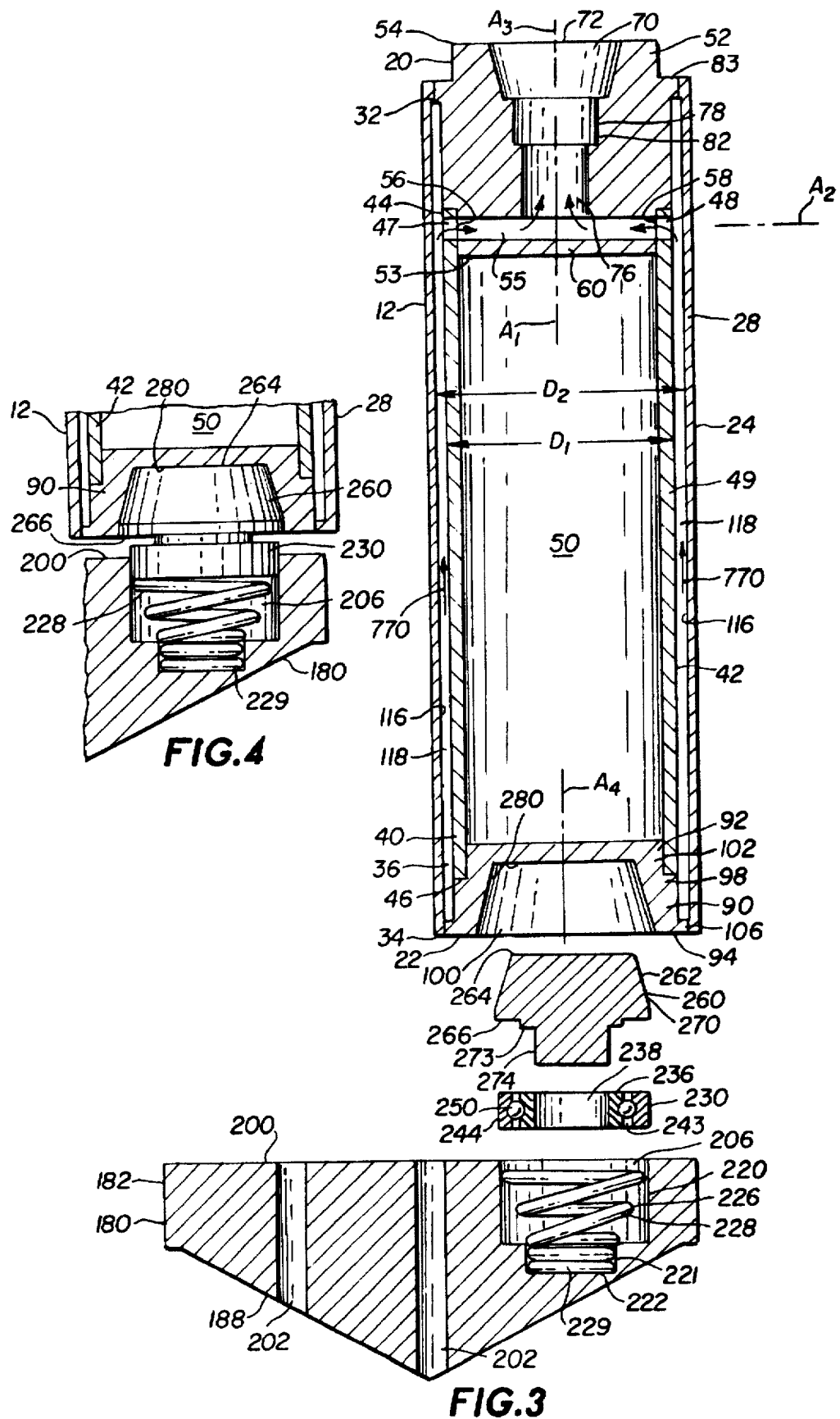
FIG. 3 is an exploded view (partially in cross-section) of a representative filter cartridge unit, cartridge unit support member, and components associated therewith which are used in the system of FIG. 1.
FIG. 4 is an assembled view (partially in cross-section) of part of the filter cartridge unit, a portion of the cartridge unit support member, and components associated therewith which are used in the system of FIG. 1.

With reference to FIG. 3, a cross-sectional view of cartridge unit 12 is illustrated. All of the functional and structural characteristics of cartridge unit 12 as described herein are applicable to cartridge units 14, 16 unless otherwise indicated. As illustrated in FIG. 3, the cartridge unit 12 is of substantially cylindrical design, and first includes an open upper end 20, a closed lower end 22, a medial portion 24, and a longitudinal axis "$A_1$". The open character of the upper end 20 and the closed character of the lower end 22 will be described in greater detail below. In a preferred embodiment, the medial portion 24 consists of a tubular side wall portion 28 which is circular in cross-section. The term "tubular" as used herein shall generally signify an elongate structure having a bore or passageway therethrough surrounded by a continuous wall. The side wall portion 28 is manufactured of filter material and is designed to separate suspended solids from fluids or slurries during operation of the fluid treatment system 10. In a preferred and optimum embodiment, the side wall portion 28 is manufactured of sintered metal (e.g. stainless steel, titanium, aluminum, tantalum, and the like). Sintering basically involves the adhesion of metallic particles to each other at temperatures below the melting point of the metals being used. As a result, a durable structure with microscopic pores is formed. A preferred metal used to produce the side wall portion 28 is sintered stainless steel. Such a material normally has a porosity of about 75–85%, with an average pore size ranging from about 3–100 microns depending on the production characteristics selected during the sintering process. The particular filter material to be chosen for a desired application will depend on the size of the suspended solids to be filtered, and the environment in which the fluid treatment system 10 is to be used. Thus, the present invention shall not be limited to any particular pore size in the selected filter material.

As noted above, sintered stainless steel is a preferred material for use in connection with the side wall portion 28 of the filter cartridge unit 12. This material is highly durable and resistant against numerous corrosive compositions (e.g. salt water, phosphoric acid, and organic acids). A tubular side wall portion 28 manufactured from sintered stainless steel is commercially available under the name SIKA-FIL from Newmet Krebsoge, Inc. of Terryville, Conn. (USA).

With continued reference to FIG. 3, the tubular side wall portion 28 further includes an upper end 32, a lower end 34, and an interior region 36 therein. The side wall portion 28 is continuous in configuration and entirely surrounds the interior region 36. In a preferred embodiment, positioned within the interior region 36 is a rigid core member 40. The core member 40 is preferably manufactured from an inert plastic known in the art (e.g. polysulfone). However, the core member 40 may be constructed from a number of different compositions, and shall not be limited to this particular material. The core member 40 includes a medial section 42 having a first end 44 and a second end 46 as illustrated in FIG. 3. The first end 44 includes dual openings 47, 48 therein which are substantially aligned with each other as shown. The medial section 42 further includes a tubular exterior wall 49 which is continuous in design (except with respect to openings 47, 48), and entirely surrounds an internal cavity 50 within the core member 40. As shown in FIG. 3, the diameter "$D_1$" of the medial section 42 of the core member 40 is less than the diameter "$D_2$" of the interior region 36 of tubular side wall portion 28 described above. This configurational relationship and the benefits thereof will be described in greater detail below.

Fixedly secured to the first end 44 of the medial section 42 of core member 40 using a conventional adhesive composition (e.g. a cyanoacrylate or epoxy resin adhesive known in the art) is an upper cap member 52. The upper cap member 52 is preferably made of the same material used to construct the medial section 42, and includes an inner end 53 and an outer end 54. Positioned between the inner end 53 and the outer end 54 at a location adjacent the inner end 53 is a longitudinal bore 55 passing entirely through the upper cap member 52 having a longitudinal axis "$A_2$" which is substantially perpendicular to the longitudinal axis "$A_1$" described above. The longitudinal bore 55 further includes an open first end 56 and open second end 58 as discussed in greater detail below.

The inner end 53 of the upper cap member 52 further includes an inwardly-extending portion 60 of narrowed diameter which includes the bore 55 therethrough (FIG. 3). The inwardly-extending portion 60 is sized to fit within the internal cavity 50 of the medial section 42 of core member 40. To the secure the inwardly extending portion 60 of the upper cap member 52 to and within the first end 44 of the medial section 42 as illustrated, adhesive materials of the type described above may be applied to the first end 44, the inwardly-extending portion 60, or to both of these structures. When the upper cap member 52 is properly attached, the first end 56 of the bore 55 will be aligned with the opening 47 in the first end 44 of the core member 40 (FIG. 3). Likewise, the second end 58 of the bore 55 will be aligned with the opening 48 in the first end 44 of core member 40.

The upper cap member 52 further includes an elongate opening 70 which extends partially through the cap member 52 in a downward direction (FIG. 3). The opening 70 has a longitudinal axis "$A_3$" which is axially aligned with the longitudinal axis "$A_1$" of the filter cartridge unit 12 and perpendicular to the longitudinal axis "$A_2$" of the bore 55. In this configuration, the elongate opening 70 is substantially perpendicular to and in fluid communication with the bore 55 as illustrated. The elongate opening 70 has an upper end 72, a lower end 76, and an intermediate section 78. The lower end 76 terminates at the bore 55 and is in fluid communication therewith. In this configuration, the elongate opening 70 does not pass entirely through the upper cap member 52, and instead terminates at the longitudinal bore 55. Finally, at least a portion 82 of the intermediate section 78 is preferably square in cross-section as described in greater detail below. As discussed below, the opening 70, bore 55, and openings 47, 48 collectively function as an outlet in the upper end 20 of the cartridge unit 12.

To secure the upper cap member 52 to the side wall portion 28 of cartridge 12, the upper cap member 52 includes an annular flange 83 designed for attachment to and within the side wall portion 28. A selected adhesive material of the same type described above is applied to the flange 83, the upper end 32 of the side wall portion 28 or to both of these structures. As a result, the upper cap member 52 is effectively secured to the side wall portion 28 of cartridge unit 12.

Fixedly secured to the second end 46 of the medial section 42 of core member 40 using a conventional adhesive composition of the type described above is a lower cap member 90. The lower cap member 90 is preferably made of the same material used to construct the medial section 42 and upper cap member 52, and further includes an inner end 92, an outer end 94, and a medial section 98 therebetween. The outer end 94 includes a substantially frustoconical opening 100 therein which extends into the medial section 98 of the lower cap member 90 but does not pass entirely therethrough. The opening 100 has a longitudinal axis "$A_4$" which is axially aligned with the longitudinal axis "$A_1$" of the cartridge unit 12. The function of opening 100 will be described in greater detail below.

The inner end 92 of the lower cap member 90 further includes an inwardly-extending section 102 of narrowed diameter which is sized to fit within the internal cavity 50 of the medial section 42 of core member 40. To the secure the lower cap member 90 to the second end 46 of the medial section 42 as illustrated, adhesive materials of the type described above may be applied to the second end 46, the inwardly-extending section 102 of the lower cap member 90, or to both of these structures.

To secure the lower cap member 90 to the side wall portion 28 of the cartridge unit 12, the outer end 94 of the cap member includes an annular flange 106 which is designed for attachment to and within the lower end 34 of the side wall portion 28. A selected adhesive composition of the same type described above relative to upper cap member 52 is then applied to the lower end 34 of the side wall portion 28, the annular flange 106, or to both of these structures.

As stated above, FIG. 3 illustrates a cross-sectional view of the cartridge unit 12 having the core member 40 therein. The diameter "$D_1$" of the medial section 42 is less than the diameter "$D_2$" of the interior region 36 of side wall portion 28 as previously noted. In this configuration, the medial section 42 of the core member 40 is spaced inwardly from the side wall portion 28 (e.g., inwardly from the interior surface 116 thereof) to form a fluid flow passageway 118 between the core member 40 and the side wall portion 28. As shown in FIG. 3, the fluid flow passageway 118 extends along the entire length of the medial section 42 of core member 40.

The specific design of filter cartridge unit 12 as described above is preferred for use with the fluid treatment system 10. However, the present invention shall not be limited to the particular design and materials associated with cartridge unit 12. Sintered metal materials other than stainless steel may be used, and the internal configuration of the selected cartridge units may also be varied. In addition, non-metallic cartridge units may be used in the system 10, including but not limited to one or more of the membrane-type structures described above in U.S. Pat. Nos. 4,790,942; 4,867,878; 4,876,013; 4,906,379; 4,911,847; and 5,000,848. However, sintered metal cartridge units are preferred, and provide superior longevity. Cartridge durability in the system 10 is important because of significant fluid turbulence created between the rotating multiple cartridge units 12, 14, 16 described above. Tests conducted using membrane-type cartridge units have demonstrated that membrane disruption and deterioration may occur when high rotational speeds are involved (e.g. speeds above about 2500–3000 rpm). Thus, while membrane-type cartridge units will operate in the system 10 under controlled rotational conditions, cartridge units using sintered metal structures are preferred since they are substantially unaffected by high rotational speeds.

As indicated above, the system 10 may involve two or more filter cartridge units, with the total number of cartridge units depending on the environment in which the system 10 is to be used. Mowever, it is preferred that the system 10 use three filter cartridge units 12, 14, 16 positioned in a triangular arrangement schematically shown in FIG. 7. In the triangular arrangement of FIG. 7, each of the filter cartridge units 12, 14, 16 is positioned at and centered on one of the apices 120, 122, 124 of an equilateral triangle 126. In this configuration, the cartridge units 12, 14, 16 are spaced equidistantly from each other by a distance "$D_3$" which is preferably not less than about 0.1 inch. The distance "$D_3$" may be greater than 0.1 inch as desired and determined by preliminary pilot studies on the fluid being treated. Accordingly, the present invention shall not be limited to the particular design described above which is provided herein as a preferred embodiment. Regardless of the selected design, it is preferred that each cartridge unit be separated from any adjacent cartridge units by the distance "$D_3$" recited above.

All of the cartridge units 12, 14, 16 are positioned within a primary housing 150 which is preferably circular in cross-section and made of transparent plastic (FIGS. 1-2). The primary housing 150 further includes an annular side wall 152, an upper end 154, a lower end 156, and an internal chamber 160 therein which is entirely surrounded by the side wall 152 (FIG. 1). Passing through the side wall 152 is a bore 162 which functions as an inlet port. In a preferred embodiment, the bore 162 will have a flexible conduit 163 (e.g. made of rubber or the like) frictionally or adhesively affixed therein which is used to introduce fluid materials into the primary housing 150. The upper end 154 of the primary housing 150 may also include a threaded region 166 (FIG. 2) in the exterior surface 168 thereof, the function of which will be described below.

With reference to FIG. 1, the bottom portion 170 of the internal chamber 160 includes a conical section 172 with inwardly sloping side walls 174. The side walls 174 lead into a center bore 176 which passes entirely through the lower end 156 of the housing 150. The bore 176 functions as an outlet port as further described below, and preferably includes a flexible drain conduit 177 (e.g. made of rubber or the like) frictionally or adhesively affixed therein. The drain conduit 177 also includes a conventional stopcock assembly 178 attached thereto as discussed below.

Positioned partially with the conical section 172 in the internal chamber 160 (FIG. 1) is a cartridge unit support member 180 shown in enlarged format in FIGS. 3-4. The cartridge unit support member 180 includes an upper portion 182 which is substantially circular in cross-section. The cartridge unit support member 180 further includes a substantially conical lower portion 188 which extends partially into the conical section 172 of the internal chamber 160 (FIG. 1). As a result, an open center zone 190 is formed between the conical lower portion 188 and the sloping side walls 174 within the chamber 160 as illustrated in FIG. 1.

With reference to FIGS. 3-4, the upper portion 182 of the cartridge unit support member 180 includes a planar upper surface 200 having multiple drainage bores 202 therein which pass entirely through the support member 180 as illustrated in FIG. 3. The number of drainage bores 202 may be varied, and the present invention shall not be limited to any particular quantity of bores 202. In addition, the cartridge unit support member 180 further includes a plurality of openings 206 therein (FIG. 2), with each opening extending partially through the support member 180. One of the openings 206 is illustrated in FIG. 3. Only one opening 206 is shown in FIG. 3 since the other two openings 206 illustrated in FIG. 2 would not be visible in the cross-sectional view of FIG. 3. As shown in FIG. 3, each opening 206 extends through the upper portion 182 of the support member 180 and terminates above the conical lower portion 188. The precise number of openings 206 in the support member 180 will equal the number of cartridge units to be used in the system 10 (e.g. three in the embodiment described herein).

Each opening 206 (which is preferably circular in cross-section) includes an annular interior side wall 220 and a lower section 221 of narrowed diameter with a substantially planar bottom surface 222. In addition, each opening 206 is designed to receive a biasing member 226 therein as shown in FIGS. 3-4. The biasing member 226 preferably consists of a conical coil spring 228 of standard design which is smaller than that of its respective opening 206 so that the spring 228 may be placed therein as illustrated. Also, the spring 228 preferably has a bottom portion 229 of narrowed diameter which is designed for placement within the lower section 221 of the opening 206. As a result, the bottom portion 229 of the spring 228 will rest on the bottom surface 222 of the opening 206 as illustrated in FIG. 3. Other types of biasing members may be used in connection with the present invention which shall not be limited exclusively to the use of coil springs. For example, conventional miniature leaf-type spring assemblies, resilient rubber or foam pads, and the like (not shown) may also be used.

Positioned on top of the spring 228 within each opening 206 is a bearing member 230. The bearing member 230 is of a type well known in the art which specifically includes an inner annular member 236 having a circular opening 238 therein. The inner annular member 236 is positioned (e.g. nested) within a circular opening 243 in an outer annular member 244, with the opening 243 having a greater diameter than that of the inner annular member 236. However, the diameter of the outer annular member 244 is slightly less than the diameter of its respective opening 206 so that the bearing member 230 may be received therein (FIG. 4). The inner annular member 236 is freely rotatable relative to the outer annular member 244. Rotation in this manner is accomplished through the use of a plurality of spherical steel ball bearing members 250 positioned between the inner and outer annular members 236, 244. This type of bearing member 230 is known in the art and of conventional design. It is commercially available from a variety of sources including but not limited to the Moore Bearing Co. of Golden Colo. (USA)—part no. 6002-SS. In addition, the present invention shall not be limited exclusively to the bearing member 230 described above. Other bearing members of differing structural design may likewise be used with an equal degree of effectiveness, provided that they are capable of placement within the openings 206 in the support member 180.

As illustrated in FIG. 4, the each bearing member 230 is positioned within its respective opening 206 in the support member 180 so that the bearing member 230 rests on top of spring 228. In this configuration, the entire bearing member 230 is axially movable in a free-floating manner on top of its respective spring 228. It should also be noted that each opening 206, spring 228, and bearing member 230 are sized so that each bearing member 230 preferably extends very slightly above the planar upper surface 200 of the cartridge unit support member 180 (FIG. 4).

Positioned on top of each bearing member 230 is a plug-like connecting member 260 having a substantially frustoconical upper portion 262 with a top surface 264, a bottom surface 266, and an angled side wall portion 270. Extending downwardly from the bottom surface 266 and integrally formed therewith is a flange-like portion 273 and a cylindrical section 274 extending outwardly from the flange-like portion 273. The cylindrical portion 274 is preferably circular in cross-section with a diameter which is smaller than the diameter of the circular opening 238 in the inner annular member 236 of each bearing member 230. In accordance with this design, each connecting member 260 is positioned on top of and against one of the bearing members 230 so that the cylindrical section 274 is inserted within the circular opening 238 in the inner annular member 236 of the selected bearing member 230. As a result, each connecting member 260 is freely-rotatable and "free-floating" on its respective bearing member 230, with insertion of the cylindrical portion 274 in circular opening 238 maintaining the connecting member 260 in correct position on bearing member 230. Free-rotation of the connecting member 260 on the bearing member 230 is facilitated by the flange-like portion 273 which rests on the inner annular member 236. As result, the bottom surface 266 of the connecting member 260 is elevated (FIG. 4) so that it does not frictionally engage the outer annular member 244 or any other portion of the bearing member 230.

Figure 7:
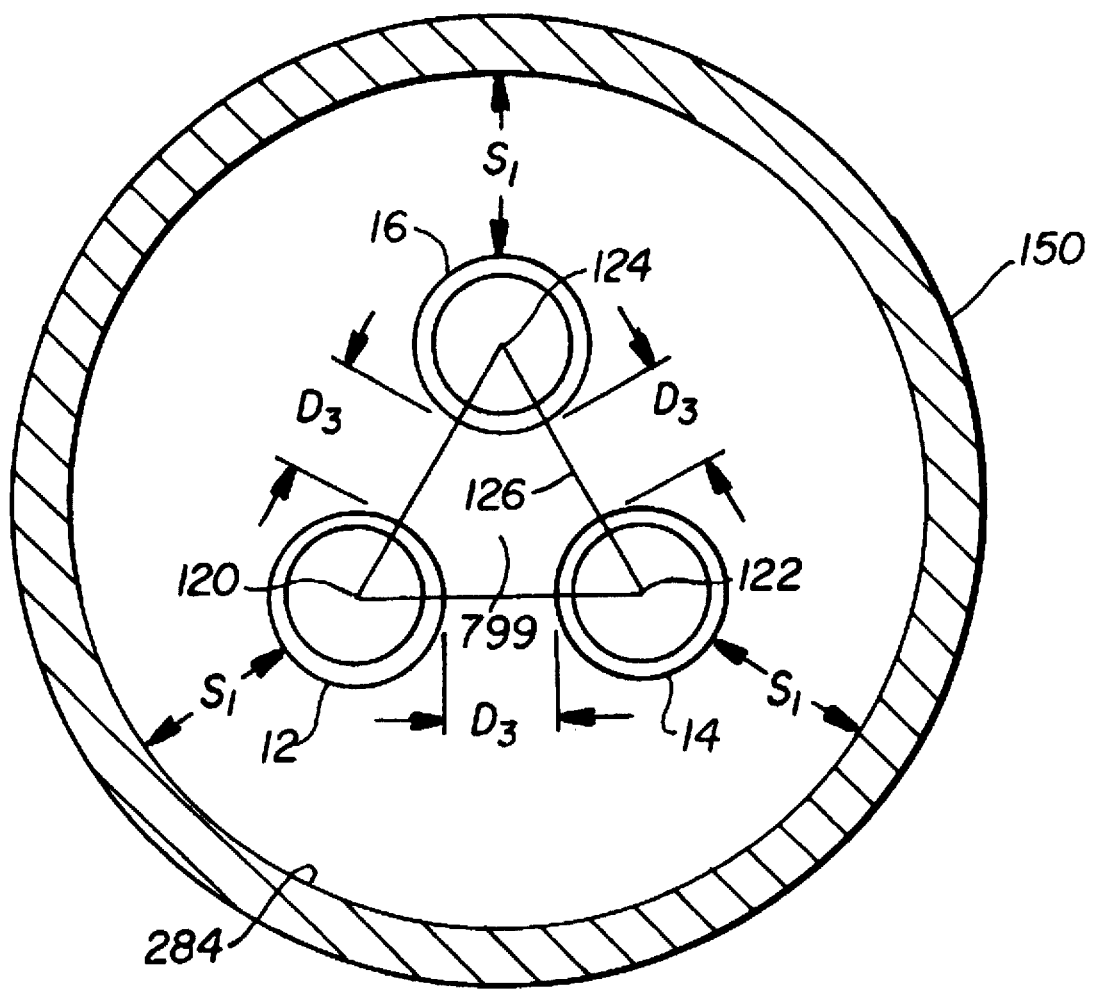
FIG. 7 is cross-sectional view of the primary housing of the system of FIG. 1 illustrating the relative distances between the filter cartridge units, and the distances between the filter cartridge units and the primary housing.

The upper portion 262 of each connecting member 260 is sized for placement within the frustoconical opening 100 in the lower cap member 90 of the cartridge unit 12 as illustrated in FIGS. 3–4. Specifically, the top surface 264 and side wall portion 270 of the connecting member 260 are frictionally engaged with the interior surfaces 280 of the opening 100. As a result, the lower end 22 of the cartridge unit 12 rests on the bearing member 230 so that the cartridge unit 12 may freely rotate, with the bearing member resting on the spring 228 as illustrated in FIG. 4. The cartridge units 14, 16 are likewise rotatable in the same manner as cartridge unit 12 using the components described above. All of the cartridge units 12, 14, 16, are therefore capable of free-floating, spring-suspended rotation on the cartridge unit support member 180 within the primary housing 150, thereby creating beneficial fluid turbulence within the housing 150 as described below. It should also be noted that, as illustrated in FIG. 7, each of the cartridge units 12, 14, 16 are spaced equidistantly from the interior surface 284 of the housing 150 by a preferred distance "$S_1$," which is not less than about 0.1 inch. The distance "$S_1$" may be greater than 0.1 inch as desired and determined in accordance with preliminary pilot studies on the fluid being treated.

Figure 6:
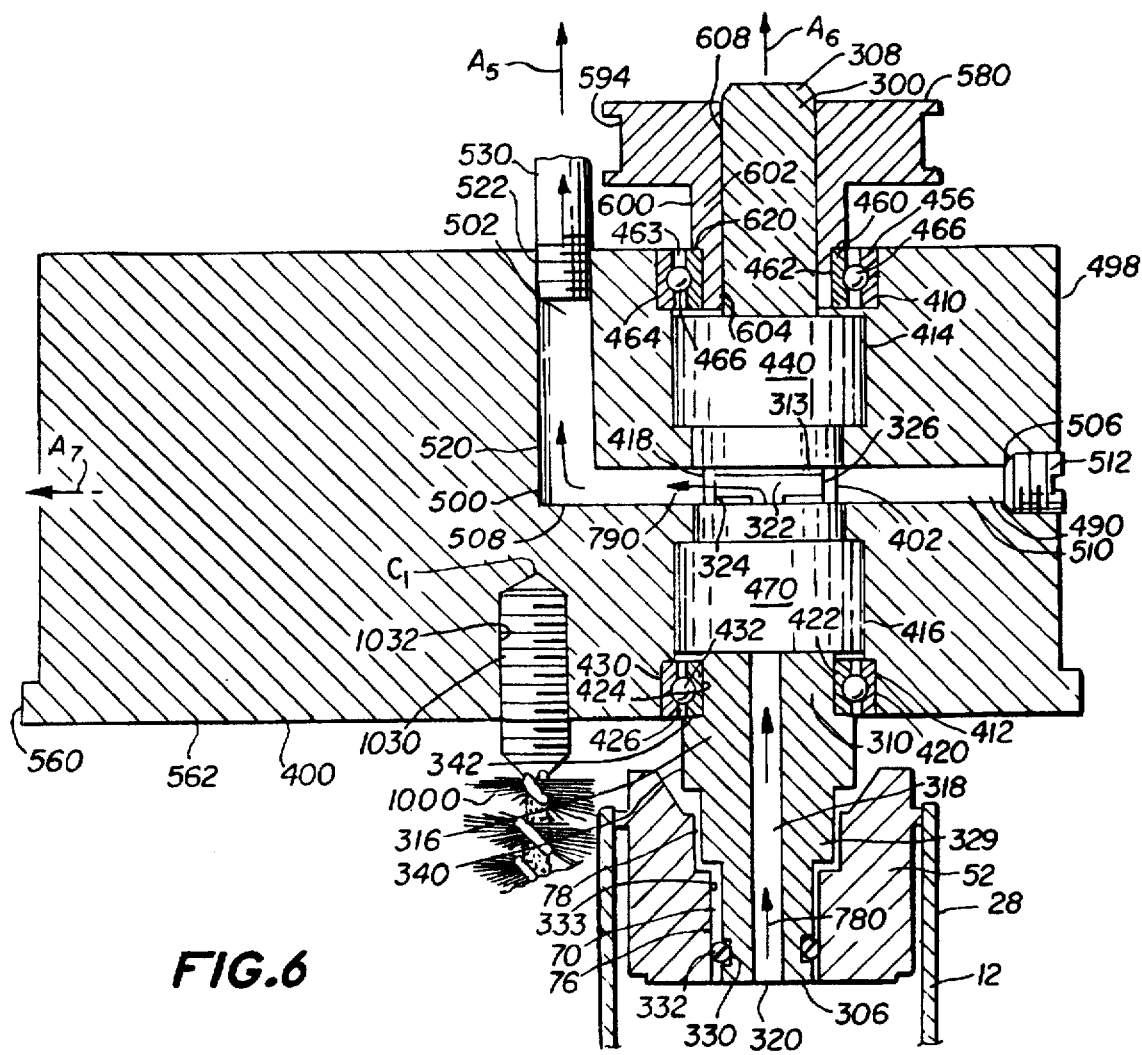
FIG. 6 is a partial cross-sectional view taken along line 6—6 of FIG. 5 which illustrates a representative main bore and fluid delivery passageway within the secondary housing of the system of FIG. 1, as well as a representative shaft member and associated components within the main bore.

With reference to FIG. 2, the fluid treatment system 10 further includes a plurality of tubular shaft members 300, 302, 304 which are designed for connection to the cartridge units 12, 14, 16, respectively. One tubular shaft member is provided for each cartridge unit used in the system 10, regardless of the number of cartridge units involved. For the sake of clarity, only shaft member 300 will be described, with the structural and functional characteristics of shaft member 300 being entirely applicable to shaft members 302, 304 unless otherwise indicated. As illustrated in FIG. 6, shaft member 300 includes an open first end 306, a closed second end 308, and a medial portion 310 between the first end 306 and the second end 308. Between the midpoint 313 of shaft member 300 and the first end 306, the medial portion 310 further includes a tubular outer wall 316 with an internal passageway 318 therein surrounded by the outer wall 316. With continued reference to FIG. 6, the passageway 318 extends continuously from an opening 320 in the first end 306 to the midpoint 313 of the shaft member 300. At this position, a bore 322 is provided which is substantially perpendicular to the passageway 318. The bore 322 passes entirely through the outer wall 316 of the shaft member 300, thereby forming dual ports 324, 326 through the outer wall 316.

The first end 306 of the shaft member 300 is sized for receipt within the lower end 76 of the elongate opening 70 in the upper cap member 52 of cartridge unit 12 as illustrated in FIG. 6. In this manner, the first end 306 of the shaft member 300 terminates at and is connected to the upper end 20 of the cartridge unit 12. In a preferred embodiment, a portion 329 of the medial section 310 of the shaft member 300 is substantially square in cross-section in order to match the preferred square configuration of portion 82 of intermediate section 78 described above. As a result, the cartridge unit 12 and shaft member 300 can rotate together during operation of the system 10 without any slippage between these components. Furthermore, in a preferred embodiment, the first end 306 of the shaft member 300 is slightly smaller than the lower end 76 of the opening 70 in upper cap member 52 so that the shaft member 300 is easily inserted therein. To ensure a fluid-tight seal between the shaft member 300 and the opening 70, the first end 306 of the shaft member 300 includes an annular recess 330 which further includes a conventional O-ring 332 therein. The O-ring 332 is designed to frictionally engage the interior wall 333 of the opening 70 (e.g. at the lower end 76) to create a fluid-tight seal.

Finally, with continued reference to FIG. 6, the medial portion 310 of the shaft member 300 includes an outwardly-extending annular section 340 having an upper surface 342, the function of which will be described hereinafter. In a preferred embodiment, the annular section 340 is positioned between the first end 306 and the bore 322 as shown in FIG. 6.

With reference to FIGS. 1–2, the fluid treatment system 10 also includes a secondary housing 400 which is adapted to receive all of the shaft members 300, 302, 304 therein. The secondary housing 400 is illustrated cross-sectionally in FIG. 5, and is preferably constructed of steel or other durable material. The secondary housing 400 and the primary housing 150 collectively constitute the main housing structure in which the cartridge units 12, 14, 16 are positioned as claimed. The secondary housing 400 includes a plurality of main bores 402, 404, 406 which pass entirely therethrough and are substantially parallel to the longitudinal axis "$A_5$" of the housing 400. The bores 402, 404, 406 are sized to receive each of the shaft members 300, 302, 304 therein, respectively. The shaft members 300, 302, 304 have a smaller diameter than that of their respective bores 402, 404, 406 so that free rotation therein is possible. For the sake of clarity, only bore 402 will be described below, with the features of bore 402 being applicable to bores 404, 406 unless otherwise indicated.

In accordance with FIG. 6, bore 402 includes an upper enlarged section 410, a lower enlarged section 412, a first internal section 414, a second internal section 416, and a center region 418. Adhesively or frictionally engaged within the lower enlarged section 412 is a bearing member 420 of the same type as bearing member 230 described above. Specifically, bearing member 420 has an inner annular member 422 with a circular opening 424 therein. The inner annular member 422 is positioned and nested within a circular opening 426 in an outer annular member 430, with the circular opening 426 having a greater diameter than that of the inner annular member 422. The inner annular member 422 is freely rotatable relative to the outer annular member 430 through the use of a plurality of spherical steel ball bearing members 432 rotatably positioned between the inner and outer annular members 422, 430. While this type of bearing member is preferred, the present invention shall not be limited to any particular bearing member as noted above.

The circular opening 424 in the inner annular member 422 is sized to receive the medial portion 310 of the shaft member 300 therein so that the medial portion 310 is frictionally engaged within the opening 424. Furthermore, in the configuration shown in FIG. 6, the upper surface 342 of the annular section 340 of shaft member 300 rests on the inner annular member 422. It should be noted that the relative diameters of the annular section 340 and the inner annular member 422 are substantially equal. Accordingly, the shaft member 300 and inner annular member 422 are able to rotate together without frictionally engaging the outer annular member 430 of bearing member 420.

Positioned within the first internal section 414 of the bore 402 is a mechanical, commercially available rotating fluid seal member 440 of conventional design (schematically illustrated in non cross-sectional form in FIG. 6). The medial portion 310 of the shaft member 300 is fixedly positioned (by frictional engagement or the like) within the seal member 440. The seal member 440 is used so that fluid materials which ultimately leave the shaft member 300 through ports 324, 326 will not leak upwardly into the main bore 402 as described in greater detail below. In addition, the seal member 440 enables rotation of the shaft member 300 within the bore 402 in a fluid-tight manner. Seal member 440 is of standard design with its operating characteristics being well-known in the art. An exemplary seal member 440 suitable for use herein is commercially available from the John Crane Seal Co. of Morton Grove, Ill. (USA) under the designation "Type 6". However, it should be noted that other commercially available seal members may be used in accordance with the present invention which shall not be limited to the use of any particular fluid seal systems.

Adhesively or frictionally engaged within the upper enlarged section 410 above and spaced outwardly from the seal member 440 is a bearing member 456 of the same type as bearing member 230. Bearing member 456 has an inner annular member 460 with a circular opening 462 therein. The inner annular member 460 is positioned and nested within a circular opening 463 in an outer annular member 464, with the circular opening 463 having a greater diameter than that of the inner annular member 460. The inner annular member 460 is freely rotatable relative to the outer annular member 464 through the use of a plurality of spherical steel ball bearing members 466 which are rotatably positioned between the inner and outer annular members 460, 464. Again, while this type of bearing member is preferred, the present invention shall not be limited to any particular bearing design. The circular opening 462 in the inner annular member 460 is sized to receive the medial portion 310 of the shaft member 300 and additional components of the system 10 as discussed in greater detail below.

Positioned within the second internal section 416 of the bore 402 above and spaced inwardly from the bearing member 420 is a mechanical, commercially-available rotating seal member 470 of the same conventional design as seal member 440 (schematically illustrated in non cross-sectional form in FIG. 6). The medial portion 310 of the shaft member 300 is fixedly positioned (by frictional engagement or the like) within the seal member 470. The seal member 470 is used so that fluid materials which ultimately leave the shaft member 300 through ports 324, 326 will not leak downwardly into the main bore 402. In addition, the seal member 470 enables rotation of the shaft member 300 within the bore 402 in a fluid-tight manner. Seal member 470 is of standard design with its operating characteristics being well-known in the art. An exemplary seal member 470 suitable for use in the system 10 is commercially available from the source listed above with respect to seal member 440.

Figure 5:
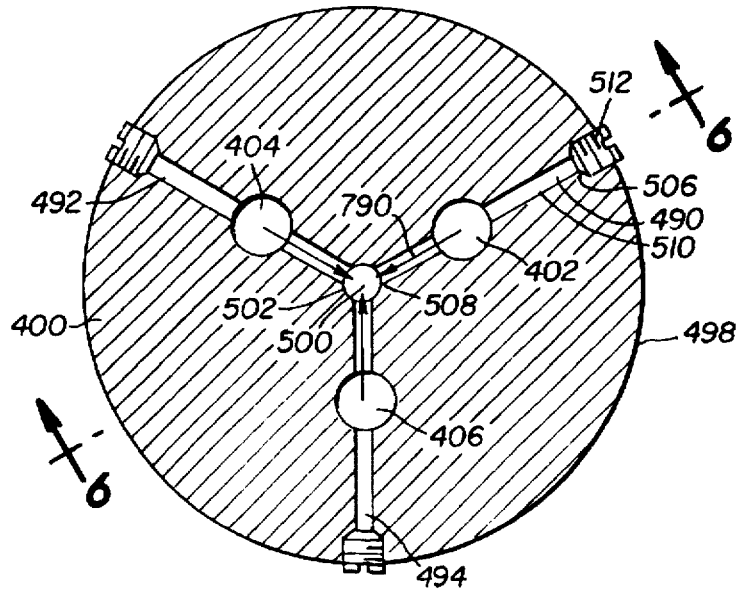
FIG. 5 is a cross-sectional view of the secondary housing of the system of FIG. 1 illustrating the main bores and fluid delivery passageways within the secondary housing, wherein the shaft members and associated components have been removed.

With reference to FIG. 5, secondary housing 400 further includes a plurality of fluid delivery passageways 490, 492, 494 in fluid communication with the main bores 402, 404, 406, respectively. In a preferred embodiment, one fluid delivery passageway will be provided for each main bore and cartridge unit associated therewith. Furthermore, each fluid delivery passageway 490, 492, 494 begins at the outer surface 498 of the secondary housing 400 and terminates at the center 500 of the housing 400 (FIG. 5). Positioned at the center 500 of the housing 400 and remotely spaced from the main bores 402, 404, 406 is a fluid collection bore 502 (FIGS. 5-6). The fluid collection bore 502 is designed to receive fluid materials from each of the fluid delivery passageways 490, 492, 494. As illustrated, all of the fluid delivery passageways 490, 492, 494 converge at the fluid collection bore 502 in the center 500 of the secondary housing 400.

To clearly illustrate the functional and structural characteristics of the fluid delivery passageways 490, 492, 494, passageway 490 will be described in detail. The specific features of fluid delivery passageway 490 are applicable to passageways 492, 494 unless otherwise indicated below. As shown in FIGS. 5-6, the passageway 490 includes a first end 506, a second end 508, and a medial section 510 between the first and second ends 506, 508. The first end 506 terminates at the outer surface 498 of the secondary housing 400, and preferably includes a fluid-tight threaded plug member 512 secured therein (shown non cross-sectionally in FIG. 6) to prevent the leakage of fluid materials outwardly from the secondary housing 400. Passing through the medial section 510 of the passageway 490 is the main bore 402 as illustrated. In accordance with this structural relationship, the passageway 490 is in fluid communication with the bore 402. Furthermore, in a preferred embodiment, the longitudinal axis "$A_6$" of the main bore 402 is substantially perpendicular to the longitudinal axis "$A_7$" of the passageway 490 (FIG. 6).

With continued reference to FIG. 6, the bore 322 in the shaft member 300 (as well as the ports 324, 326) are precisely positioned within the center region 418 of the main bore 402 and in axial alignment with the fluid delivery passageway 490. As a result, fluid materials leaving the rotating shaft member 300 via the bore 322 and ports 324, 326 will flow into the fluid delivery passageway 490. Again, fluid leakage into other portions of the secondary housing 400 during this process is prevented through the use of seal members 440, 470.

The second end 508 of the fluid delivery passageway 490 is remotely spaced from the main bore 402 and positioned substantially at the center 500 of the secondary housing 400. At this position, the passageway 490 (and the other fluid delivery passageways 492, 494) are in fluid communication with fluid collection bore 502. The fluid collection bore 502 has the same longitudinal axis as the axis "$A_5$" of the secondary housing 400 which is perpendicular to the longitudinal axis "$A_7$" of the passageway 490 and parallel with the longitudinal axis "$A_6$" of main bore 402. As shown in FIG. 6, the fluid collection bore 502 has a first end 520 which is positioned at the center 500 of the secondary housing 400 and a second end 522 having an external fluid collection conduit 530 (shown in non cross-sectional form in FIG. 6) which is partially engaged therein in a conventional manner.

It should also be noted that the secondary housing 400 may have additional tunnels or passageways therein (not shown) which extend inwardly from the outer surface 498 thereof to one or more of the main bores 402, 404, 406 so that they may be flushed and cleaned as desired. In addition, there are a number of ways in which the primary housing 150 may be secured to the secondary housing 400, and present invention shall not be limited to any particular attachment method. For example, in one embodiment illustrated in FIG. 2, an annular retaining ring 550 is provided which has a central opening 552 therein. The diameter of the opening 552 is greater than the diameter of the secondary housing 400, thereby allowing passage of the housing 400 through the opening 552 so that the ring 550 may be positioned on the housing 400 as illustrated in FIG. 1. However, the top portion 554 of the ring 550 is manufactured so that it includes an annular, outwardly extending portion 556 which is sized to abuttingly engage an annular flange 560 extending outwardly from the bottom surface 562 of the secondary housing 400 (FIG. 6). Using these components, the retaining ring 550 may be placed on the secondary housing 400, with accidental removal of the ring 550 being prevented by cooperative action of the outwardly extending portion 556 of the ring 550 and the annular flange 560 on the secondary housing 400. Furthermore, as illustrated in FIG. 2, the ring 550 includes an internal threaded region 566. To secure the primary housing 150 and secondary housing 400 together, these components are first axially aligned and placed together so that the bottom surface 562 of the secondary housing 400 is positioned against the upper end 154 of the primary housing 150. As noted above, the upper end 154 of the primary housing 150 includes threaded region 166 in the exterior surface 168 thereof. The retaining ring 550 is then urged downwardly and rotated so that the threaded region 566 of the ring 550 engages the threaded region 166 of the primary housing 150. The ring 550 is then tightened as desired. Other exemplary attachment systems for the primary and secondary housings 150, 400 include the use of external clamping mechanisms known in the art and conventional screw type connecting systems (not shown), with the present invention not being limited to any particular attachment assembly.

To effectively rotate all of the cartridge units 12, 14, 16 simultaneously during operation of the system 10, a specialized motor drive system is provided. With reference to FIG. 2, each of the shaft members 300, 302, 304 associated with cartridge units 12, 14, 16 includes an annular pulley member 580, 582, 584 thereon, respectively. Regarding the structural configuration of the pulley members 580, 582, 584, pulley member 580 (and shaft member 300 secured thereto) will be described. Unless otherwise indicated, the following information regarding shaft member 300 and pulley member 580 is equally applicable to pulley members 582, 584 and shaft members 302, 304. As shown in FIG. 6, annular pulley member 580 includes a recessed region 594 which is sized to receive a continuous belt as discussed below. Formed as an integral part of the pulley member 580 and extending downwardly therefrom is a shaft portion 600 which includes a first section 602 and a second section 604. The second section 604 has a smaller diameter than the first section 602 (FIG. 6). The pulley member 580 also has an opening 608 which passes entirely therethrough. The opening 608 is designed to receive part of the closed second end 308 and medial portion 310 of the shaft member 300 therein. The pulley member 580 is fixedly secured in position on the shaft member 300 by frictional engagement between these components or through the use of adhesives, set screws within the pulley member 580 (not shown) or other conventional fastening systems.

As shown in FIG. 6, the second section 604 of the shaft portion 600 of pulley member 580 is positioned (e.g. frictionally engaged) within the circular opening 462 in the inner annular member 460 of bearing member 456. In addition, the first section 602 of the shaft portion 600 further includes a lower annular face 620 which rests on the inner annular member 460 of bearing member 456 so that the entire shaft assembly (e.g. the shaft member 300 and pulley member 580 secured thereto) may freely rotate on the bearing member 456. It should be noted that the diameter of the first section 602 of pulley member 580 is substantially equal to the diameter of the inner annular member 460 of bearing member 456 so that the first section 602 does not frictionally engage the outer annular member 464 of bearing member 456.

To rotate all of the pulley members 580, 582, 584 and cartridge units 12, 14, 16 in a simultaneous manner, motor drive means 630 is provided as illustrated in FIGS. 1, 2, 8, and 9. In a preferred embodiment, the motor drive means 630 consists of a conventional electric motor 632 which is well known in the art. The motor 632 includes a center drive shaft 633 (FIGS. 8–9) having a drive pulley member 634 secured thereto. In a preferred embodiment, the drive pulley member 634 has a structural configuration substantially identical with that of the annular pulley member 580. Attachment of the drive pulley member 634 to the drive shaft 633 may be undertaken by welding, adhesive affixation, set screws within the drive pulley member 634 (not shown) which may be tightened against the drive shaft 633, or other conventional attachment methods.

Figure 8:
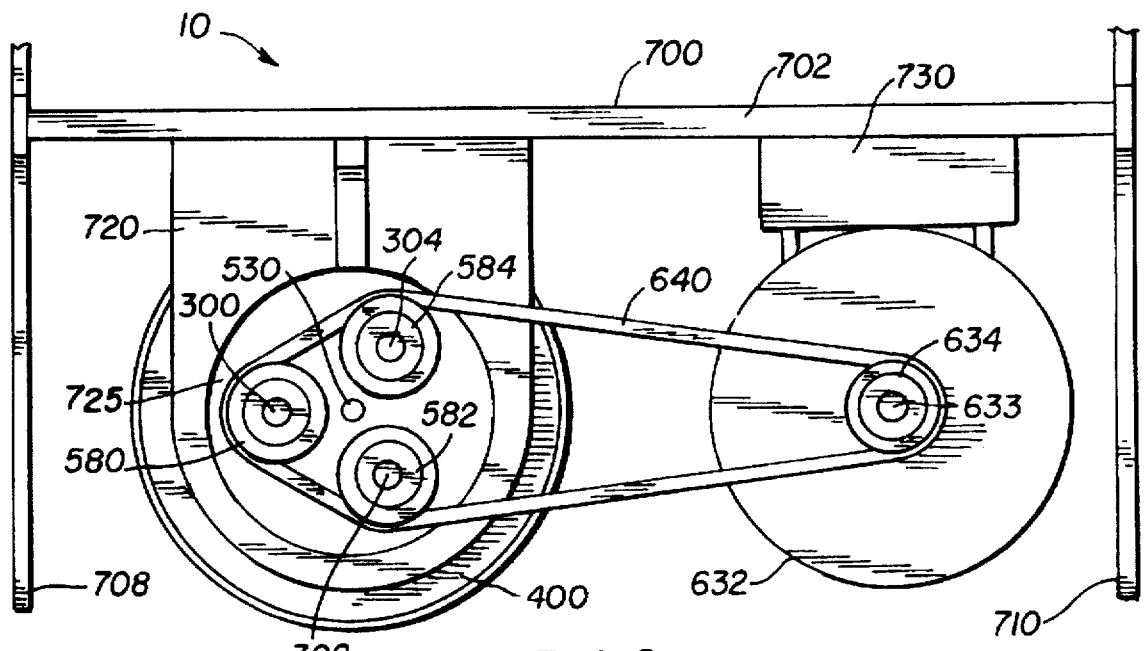
FIG. 8 is a top plan view of a first embodiment of the system of FIG. 1 wherein the belt guard has been removed to illustrate the orientation of the drive belt around the pulley members associated with the filter cartridge units.
Figure 9:
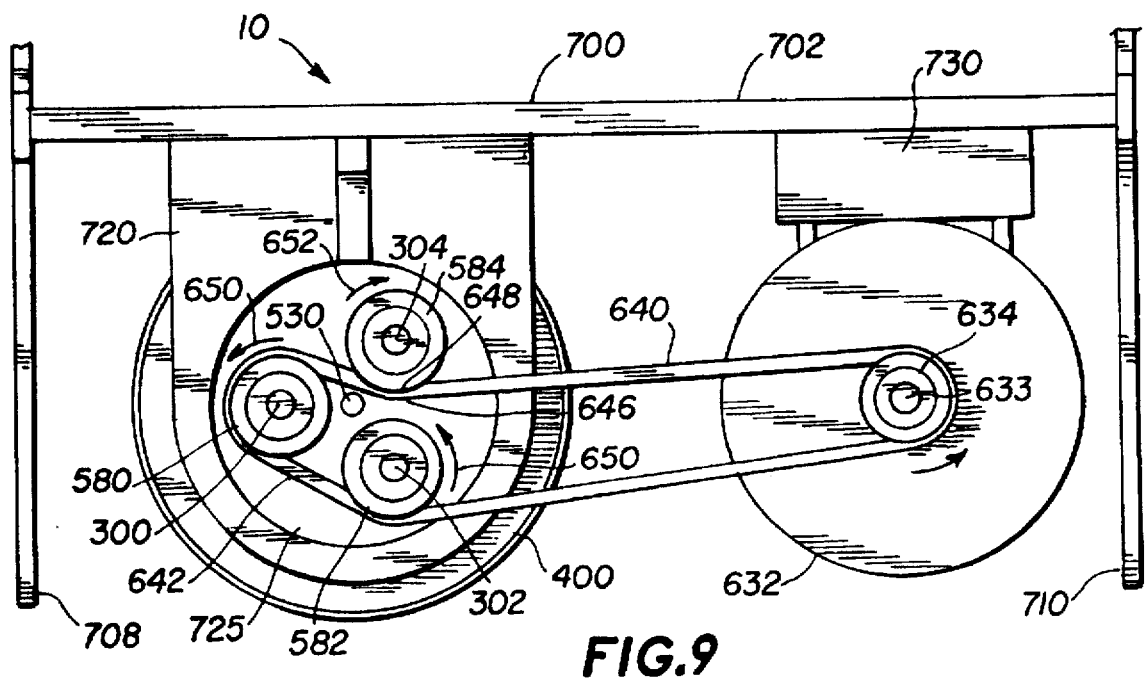
FIG. 9 is a top plan view of a second embodiment of the system of FIG. 1 wherein the belt guard has been removed to illustrate an alternative orientation of the drive belt relative to the pulley members associated with the filter cartridge units.

So that the motor 632 may simultaneously rotate the cartridge units 12, 14, 16, a continuous belt 640 is provided which is made of rubber or the like. In a first embodiment, the belt 640 is positioned on the drive pulley member 634 and the pulley members 580, 582, 584 in the configuration shown in FIG. 8. In this configuration, the belt 640 is positioned around the pulley members 580, 582, 584, and 634 so that they all rotate in the same direction (either clockwise or counterclockwise). In an alternative embodiment, the belt 640 may be positioned on the pulley members 580, 582, 584 in a serpentine configuration as shown in FIG. 9. Specifically, portion 642 of the belt 640 is positioned around the pulley members 580, 582 as in the first embodiment of FIG. 8, while portion 646 of the belt 640 is positioned between pulley members 582, 584. As a result, the portion 646 contacts the pulley member 584 at an inside position 648 thereon. Using this configuration, the pulley member 584 will rotate in one direction (e.g. in a first direction as indicated by arrow 652) while the pulley members 580, 582 will rotate in a second direction opposite the first direction (see arrows 650). In certain applications involving the treatment of specific fluids, this alternative configuration will create additional fluid turbulence and enhanced operating capacity as described below. The selection of a particular belt arrangement will normally involve preliminary pilot studies on the fluid materials being treated so that the best method may be chosen. Furthermore, the embodiment of FIG. 9 shall not be limited to a situation wherein pulley member 584 is rotating in an opposite direction with respect to pulley members 580, 582. Instead, the belt 640 may be oriented so that, for example, the pulley members 580, 584 are rotating in a first direction with the pulley member 582 rotating in a second opposite direction. Regardless of which orientation is selected regarding the belt 640, this alternative embodiment will result in one of the cartridge units being rotated in a first direction, with two of the cartridge units being rotated in a second direction opposite the first direction. As a result, each of the cartridge units 12, 14, 16 will rotate in at least one of the first and second directions described above.

With reference to FIG. 1, the entire system 10 preferably includes a support stand 700 which is designed to suspend the primary housing 150, secondary housing 400 and motor 632 in an upright, vertical position. To accomplish this, a panel member 702 is provided which includes side edges 704, 706 to which triangular support legs 708, 710 are respectively secured. The support legs 708, 710 are secured to the side edges 704, 706 by welding or the use of conventional screws (not shown). The panel member 702 further includes an outer face 712 having a mounting plate 720 secured thereto by welding or conventional mechanical fasteners (e.g. screws). The mounting plate 720 has an upper surface 722, a lower surface 724, and a circular opening 725 therein (FIG. 2) which is sized to allow the pulley members 580, 582, 584 to pass therethrough. As illustrated in FIG. 1, the top surface 726 of the secondary housing 400 is secured by welding, mechanical fasteners (e.g. screws), or the like to the lower surface 724 of the mounting plate 720 in order to suspend the primary and secondary housings 150, 400 in position. Likewise, the motor 632 is fixedly secured to a plate member 730 or other comparable structure by welding or mechanical fasteners (e.g. screws), with the plate member 730 and attached motor 632 being secured to outer face 712 of the panel member 702 in the same manner. However, it shall be understood that the mounting system for the foregoing components (e.g. the primary housing 150, secondary housing 400, and the motor 632) may be varied, and shall not be exclusively limited to the support stand 700 described above.

Finally, to ensure safe operation of the system 10, an optional belt guard 750 illustrated in FIGS. 1–2 may be positioned over the belt 640 and pulley members 580, 582, 584, 634. The belt guard 750 is preferably secured to the upper surface 722 of the mounting plate 720 using screws or other conventional mechanical fasteners. Also, it is preferred that the belt guard 750 have an opening 752 therein. The opening 752 is sized and positioned to enable passage therethrough of the external fluid collection conduit 530 (FIGS. 1 and 6) which leads into the secondary housing 400 as previously described.

Having herein described the structural components associated with a preferred embodiment of the fluid treatment system 10, a brief description of its operational characteristics will now be presented.

OPERATION OF SYSTEM IN FILTRATION MODE

As described above, the system 10 enables the high-efficiency separation of solids from a wide variety of different liquids. For example, materials ranging from beer to medicines and biological compositions may be filtered, depending on the characteristics of the selected filter materials used in connection with the filter cartridge units 12, 14, 16. The present invention shall therefore not be limited to the filtration of any particular materials.

To filter solid materials from a selected liquid, the desired liquid (fluid) is first introduced into the primary housing 150 through the conduit 163 which is secured within bore 162 in the side wall 152. As the liquid enters the housing 150, it flows between and around the filter cartridge units 12, 14, 16. In this manner, the liquid surrounds and comes in contact with the cartridge units 12, 14, 16. When the housing 150 becomes substantially filled with liquid, the motor 632 is activated which causes movement of the belt 640 and pulley members 580, 582, 584, 634 attached thereto. As a result, cartridge units 12, 14, 16 rotate simultaneously and at the same speed. In a preferred embodiment, the motor 632 is adjusted so that it rotates the cartridge units 12, 14, 16 at a uniform speed (either clockwise or counterclockwise) of about 500–4000 rpm (2500 rpm=optimum), with the actual selected speed being determined by preliminary pilot studies and the like. In the embodiment of FIG. 8, all of the cartridge units 12, 14, 16, will rotate in the same direction and at the same speed. As a result, a high degree of fluid turbulence is created around and between the rotating cartridge units 12, 14, 16. This turbulence creates rotating fluid currents and increased fluid pressures around the cartridge units 12, 14, 16. These fluid currents and pressures not only enhance fluid flow through the cartridge units 12, 14, 16, but also continuously scrub the exterior surfaces of the units 12, 14, 16 so that the blockage thereof is minimized or prevented. As a result, system down-time normally required for cleaning is substantially minimized which greatly increases filtration efficiency compared with single cartridge systems as described in the "Example" section below.

In addition, when the embodiment of FIG. 9 is involved wherein one of the cartridge units 12, 14, 16 is rotating in an opposite direction from the other units as discussed above, an additional degree of fluid turbulence is created adjacent the interior surface 284 of the primary housing 150 which may further enhance filtration efficiency, depending on the type of fluid being filtered and other parameters determined by preliminary pilot studies. This additional phenomenon (which is the subject of ongoing research) may cause enhanced scrubbing of the exterior surfaces of one or more cartridge units 12, 14, 16. However, the subsequent steps in the fluid filtration process (including fluid collection procedures) will remain the same, regardless of the direction in which the cartridge units 12, 14, 16, are rotated.

As the cartridge units 12, 14, 16 are rotating within the primary housing 150, filtration of the selected liquid materials takes place. To illustrate and describe this process, filtration will be discussed with respect to cartridge unit 12. However, information provided regarding cartridge unit 12 is equally applicable to the other cartridge units 14, 16 in the system 10.

During operation of the fluid treatment system 10, the cartridge unit 12 will rotate around its longitudinal axis "$A_1$" (FIG. 3). As cartridge unit 12 rotates, fluid materials pass through the side wall portion 28, with suspended solids being prevented from passing therethrough. Fluid materials which pass through the side wall portion 28 enter the fluid flow passageway 118 and travel upwardly in the direction of arrows 770 (FIG. 3). Because the lower cap member 90 does not have any openings therein, and because it is attached to the side wall portion 28 in a fluid-tight configuration, the lower end 22 of the cartridge unit 12 is effectively closed as noted above. Accordingly, any fluid materials which pass downwardly toward the lower cap member 90 do so on a temporary basis and are thereafter directed upwardly due to the closed nature of the lower end 22 of the cartridge unit 12. The filtered fluid materials within the fluid flow passageway 118 are then collected in accordance with the steps described below.

The filtered fluid materials thereafter pass through the openings 47, 48 in the first end 44 of the medial section 42, and into the longitudinal bore 55 (FIG. 3) in the upper cap member 52. Once again, fluid materials will not leak outwardly from the fluid flow passageway 118 within the cartridge unit 12 due to the fluid-tight adhesive seal between the upper cap member 52 and the side wall portion 28. The fluid materials within the bore 55 converge at the center thereof and pass upwardly into the elongate opening 70. Because the opening 70 terminates at the upper end 20 of the cartridge unit 12, the upper end 20 is effectively open to the outside, thereby permitting the filtered fluid materials to exit the cartridge unit 12.

The filtered fluid materials then pass into the shaft member 300 associated with the cartridge unit 12 and travel upwardly through the passageway 318 in the direction of arrows 780 due to a high degree of internal fluid pressure within the system 10 caused by the continuous influx of additional fluids. The fluid materials thereafter enter the bore 322 in shaft 300 and exit through the ports 324, 326. As the shaft member 300 continues to spin within the main bore 402 of the secondary housing 400, the fluid materials enter the fluid delivery passageway 490. Fluid leakage upwardly or downwardly into the bore 402 within the secondary housing is prevented by the seal members 440, 470. Next, the fluid materials pass through the fluid delivery passageway 490 and travel toward the second end 508 of passageway 490 (in the direction of arrows 790 shown in FIGS. 5-6). Only a minimal amount of fluid materials will enter the portion of the fluid delivery passageway 490 between the main bore 402 and the first end 506 of passageway 490 since the first end 506 is sealed at the outer surface 498 of the secondary housing 400 using the plug member 512. Once this portion of the fluid delivery passageway 490 becomes filled with fluid materials, additional fluids will not enter, thereby enabling most of the fluid materials to flow toward the second end 508 of the fluid delivery passageway 490.

As noted above, all of the fluid delivery passageways 490, 492, 494 converge at the center 500 of the secondary housing 400. Because incoming fluids enter the fluid delivery passageways 490, 492, 494 under a considerable degree of pressure, such fluids converge at the center 500 and are forced upwardly into and through the fluid collection bore 502. Fluid materials passing into the fluid collection bore 502 thereafter pass into the collection conduit 530 and are stored or discarded as desired. The collected fluid materials (e.g. fluid materials retained within the interior regions of the cartridge units 12, 14, 16) are highly purified due to the multiple rotating filter cartridge units 12, 14, 16 as well as the other functional characteristics of the system 10 described above.

Collected solid materials and residual liquids within the primary housing 150 are then drained from the system 10. This is accomplished by opening the stopcock assembly 178 in the drain conduit 177 extending outwardly from the housing 150. As a result, collected solid materials and residual liquids pass downwardly through the drainage bores 202 in the cartridge unit support member 180, into the open center zone 190 in the bottom portion 170 of the chamber 160 within housing 150, and outwardly through the conduit 177 and stopcock assembly 178. The fluids and solids may thereafter be stored or discarded as desired.

As previously stated, the use of multiple rotating filter cartridge units within a closed housing provides numerous and substantial benefits. Specifically, one of the primary benefits associated with the system of the present invention involves the self-cleaning capabilities thereof. Such capabilities result from the use of multiple cartridge units which generate a high level of fluid turbulence. This turbulence effectively prevents the accumulation of solid materials on the exterior surfaces of the cartridge units. As a result, filtration efficiency is substantially improved due to (1) a greater flow rate through the cartridge units which do not experience the rapid accumulation of solids thereon as in single cartridge systems; and (2) a reduction in the amount of system down-time which is needed for removing accumulated solids (which is significant in single cartridge systems compared with the present invention). All of these benefits are achieved to an even greater degree if a triangular arrangement of cartridge units 12, 14, 16 is used as shown in FIG. 7. This particular arrangement provides an especially high degree of fluid agitation, especially within the center zone open 799 between all of the rotating cartridge units 12, 14, 16 (FIG. 7). The enhanced degree of fluid turbulence within the open center zone 799 correspondingly generates strong fluid currents and fluid agitation in other portions of the system which provides enhanced filtration and self-cleaning capabilities. Furthermore, the open center zone 799 will be characterized by higher fluid pressure levels therein which causes additional fluid flow down the central axis of the primary housing 150.

As noted above, fluid turbulence generated in the multi-cartridge system of the invention effectively prevents the rapid accumulation of solids on the cartridge units, thereby reducing or eliminating the need to continuously deactivate the system for cleaning. In accordance with the invention, these benefits are achieved in multi-cartridge systems which use the cartridge units described above and other cartridge units of different design. To demonstrate the benefits which may be achieved through the use of a rotating, multi-cartridge system produced in connection with the invention, the following Example is provided:

EXAMPLE

In this Example, the liquid being filtered involved a brewery product known as "aging drop beer" which includes a variety of solid components therein (e.g. yeast cell debris and other residual solids). The initial turbidity of this material in the present Example was 650 ppm of the solid components listed above. Two experimental tests were run using aging drop beer.

Test One:

In test number 1, a system was employed which used a single, rotating cartridge unit positioned within a containment vessel. The cartridge unit consisted of a membrane-type 0.45 micron cylindrical filter cartridge produced by Membrex, Inc. of Garfield, N.J. (USA).

Test Two:

Test number 2 involved three rotating filter cartridge units of exactly the same type used in test number 1. These units were used and arranged in a system comparable to system 10 described above. In both tests, the cartridge units were rotated in the same direction and at the same speed (e.g. 1500 rpm). Also, the starting flow rate of aging drop beer into the systems in both tests was 200 ml/min.

Results:

TABLE I

|  | Test #1 | Test #2 |
| --- | --- | --- |
| Total run time: | 1.0 hr[1] | 3.0 hr[2] |
| Initial turbidity: | 650 ppm | 650 ppm |
| Effluent (output) turbidity: | 4.0 ppm | 2.0 ppm |
| Ending flow rate: | 16 ml/min.[3] | 25 ml/min. |
| Total flow: | 1.85 L | 10.45 L[4] |
| Average flow rate: | 36.7 ml/min. | 68.2 ml/min. |

[1] single cartridge system in test number 1 was stopped after 1.0 hr. since the cartridge unit became clogged at the surface thereof, with cloggage being defined as a fluid flow rate through the cartridge unit of less than about 15–16 ml/min.
[2] multiple cartridge system in test number 2 never reached a point in which it became clogged (e.g. characterized by a fluid flow rate through the cartridge units of less than about 15–16 ml/min.), and could have run even longer than three hours.
[3] at this flow rate (16 ml/min.) the system in test number 1 was technically clogged as noted above.
[4] this value does not represent a maximum value since the multiple cartridge system of test number 2 never became clogged during the test in accordance with the definition provided above.

The foregoing Example clearly demonstrates the superior results achieved in a multi-cartridge system compared with single cartridge systems. Specifically, the single cartridge system of test number 1 become clogged after only one hour as characterized by a flow rate of about 16 ml/min. However, in the system of test number 2, cartridge clogging (as characterized by a flow rate of less than about 15–16 ml/min.) did not occur even after three hours of continuous use. In fact, the flow rate in the system of test number 2 at the end of three hours was 25 ml/min. which is significantly greater than the flow rate of 16 ml/min. in the system of test number 1 after one hour.

In the multi-cartridge system of test number 2, a flow rate of 16 ml/min. at or before expiration of the three hour period would have been expected since the system of test number 2 had been running three times as long as the system of test number 1. More specifically, the one cartridge system became clogged after one hour which would have created an expectation that the three cartridge system would become clogged after three hours. However, this situation did not occur, with the system of test number 2 having a flow rate substantially above the 16 ml/min. level, even after three hours. The multi-cartridge system was able to filter 10.45 L of fluid without becoming clogged, while the single cartridge system filtered only 1.85 L of fluid before clogging occurred. Accordingly, while the single cartridge system processed only 1.85 L of fluid before it became clogged, the multi-cartridge system processed about 3.5 L of fluid per cartridge (e.g. 10.45 L divided by 3) because the cartridge units did not become clogged and could run longer. Clog prevention in this manner is the result of a high level of fluid turbulence created within the system as discussed above. Increased fluid turbulence creates a scrubbing effect which prevents the rapid accumulation of solids on the cartridge units.

B. Gas Diffusion Mode

As indicated above, the system 10 is multi-functional in nature, and may be used to introduce a selected gaseous material into a fluid so that the gas is effectively dissolved (diffused) within the fluid. The terms "dissolved" and "diffused" shall be used interchangeably, with both terms involving the molecular dissolution of a given gas within a selected fluid. This process is of considerable importance in many fields including the production of soft drinks and carbonated alcohol-containing beverages (beer, ales, and non-beer malt beverages of the type disclosed in U.S. Pat. No. 5,294,450 to Word et al.). Other situations in which the dissolution of gaseous materials into fluids is undertaken include but are not limited to (1) the introduction of $O_2$ into compositions used to produce fermented food/beverage materials (e.g. the infusion of $O_2$ into "wort" used in beer production); (2) the introduction of air or $O_2$ into waste materials (e.g. sewage) for aerobic digestion within waste treatment plants; (3) the introduction of ozone ($O_3$) into water materials for the purification thereof (e.g. the destruction of microorganisms); and (4) the infusion of air or $O_2$ into water used to support fish and other aquatic life forms. Accordingly, the present invention shall not be limited to the production of any particular gas-containing liquid end products.

To accomplish gas diffusion within a selected liquid in accordance with the present invention, the system 10 basically remains unchanged, with the detailed description provided above in connection with the first embodiment being applicable and incorporated by reference in this section. However, operation of the system 10 is different as discussed below. For the sake of clarity and to more accurately describe the gas diffusion process in accordance with the system 10, some of the components of system 10 will be renamed and recategorized in the following discussion. However, it again must be emphasized that the system 10 and its components (as well as the design characteristics of the cartridge units 12, 14, 16) will remain substantially the same (with only minor external modifications as discussed below).

With reference to FIG. 10, the system 10 is again illustrated in substantially unchanged form with certain notable exceptions. Specifically, an external gas storage container 800 is provided which is of conventional form (e.g. a sealed steel tank or other comparable structure known in the art for retaining pressurized gases therein). The storage container 800 is designed to retain a supply of at least one gas 802 therein for delivery to the system 10. Many different types of gases and/or combinations of gases may be held within the container 800, depending on the particular gas-containing liquid product to be manufactured using the present invention. In this regard, the present invention shall not be limited exclusively to any particular type of gas or gaseous material for use in the container 800. Exemplary gas materials suitable for use as the gas 802 in the system 10 will include but not be limited to $O_2$, $CO_2$, $N_2$, $O_3$, air, and mixtures thereof. The selected gas 802 may be compressed within the container 800 at a preferred pressure of about 10–3000 psi in order to facilitate delivery into the system 10 as discussed below.

Figure 10:
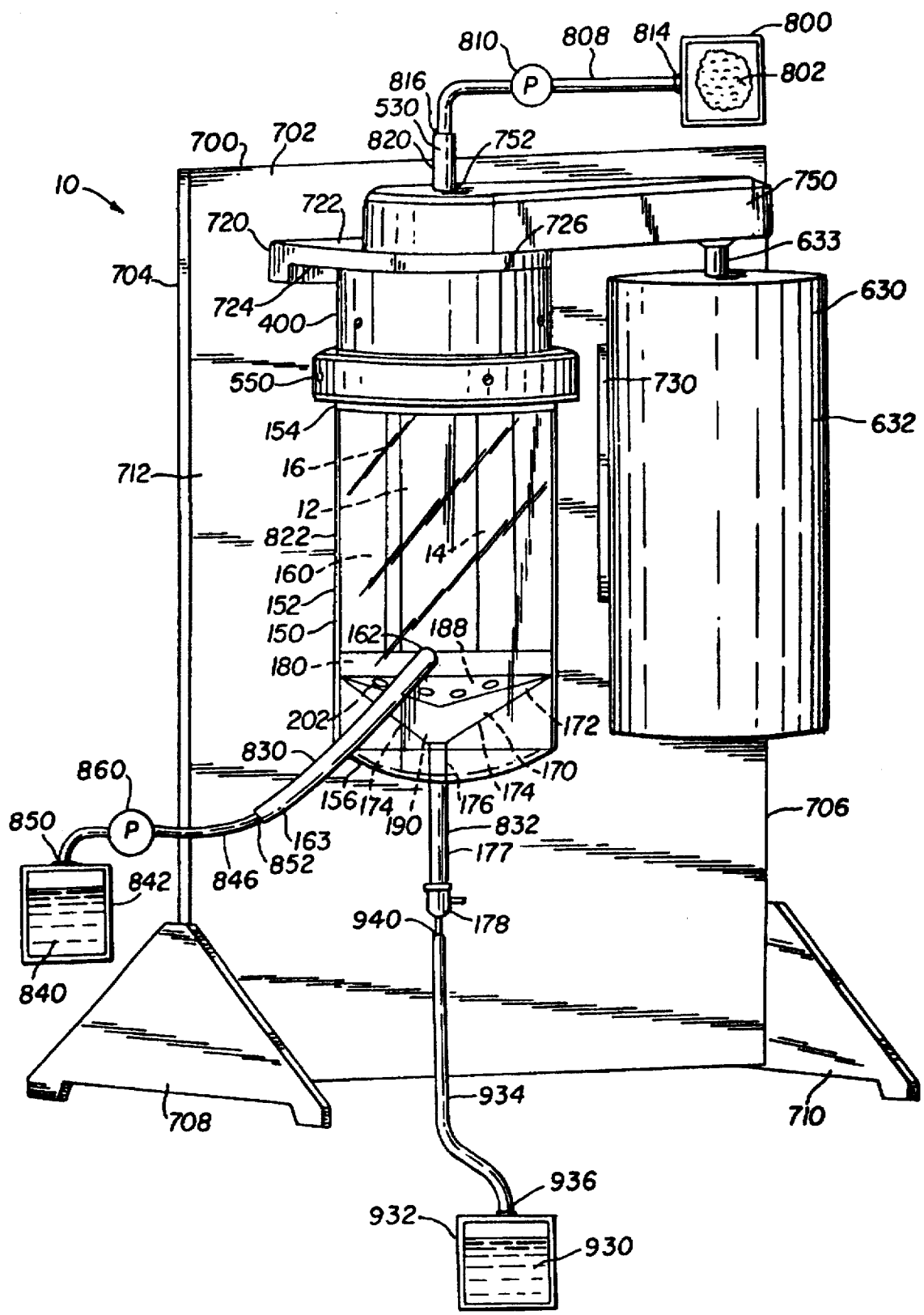
FIG. 10 is a front perspective view of a multi-cartridge fluid treatment system produced in accordance with the present invention which is used to diffuse/dissolve gas materials into a selected fluid.

With reference to FIG. 10, container 800 is connected to conduit 530 of system 10 using a tubular conduit 808. The conduit 808 may include an optional in-line pump 810 therein (schematically illustrated in FIG. 10), depending on the desired flow rate and pressurization level of the gas 802 to be used in the system 10. Use of the pump 810 will depend on various factors, including the size of the system 10 and desired rate of gas introduction as determined by preliminary pilot studies. If used, the pump 810 will be of conventional design including but not limited to standard compressor-type pumps known in the art for gas transfer.

With continued reference to FIG. 10, the conduit 808 will include a first end 814 and a second end 816. The first end 814 is connected to the storage container 800, with the second end 816 being connected to the conduit 530 which leads into the system 10. In this embodiment of the present invention, the conduit 530 shall constitute a primary inlet port 820, since gas materials from the container 800 (e.g. gas 802) initially enter the system 10 through the conduit 530.

Furthermore, as described above in the first embodiment of the present invention, the system 10 basically includes a primary housing 150 which is detachably connected to a secondary housing 400 (FIGS. 1 and 10). For the purposes of this embodiment, the primary and secondary housings 150, 400 shall collectively constitute a fluid containment chamber 822 illustrated in FIG. 10, with inlet port 820 (e.g. conduit 530) leading into chamber 822 so that the gas 802 may be supplied to the system 10 as discussed below. It should also be noted that the conduit 163 and bore 162 in the primary housing 150 (FIGS. 1 and 10) shall collectively constitute a secondary inlet port 830 which is used to supply the fluid containment chamber 822 (e.g. primary housing 150) with fluid materials that are subsequently combined with the gas 802 as described below.

Finally, the drain conduit 177 and associated stopcock assembly 178 which extend outwardly from the lower end 156 of the primary housing 150 (e.g. chamber 822) shall collectively constitute an outlet port 832 which is used to remove the final gas-containing liquid product from the system 10 as also discussed below.

Figure 12:
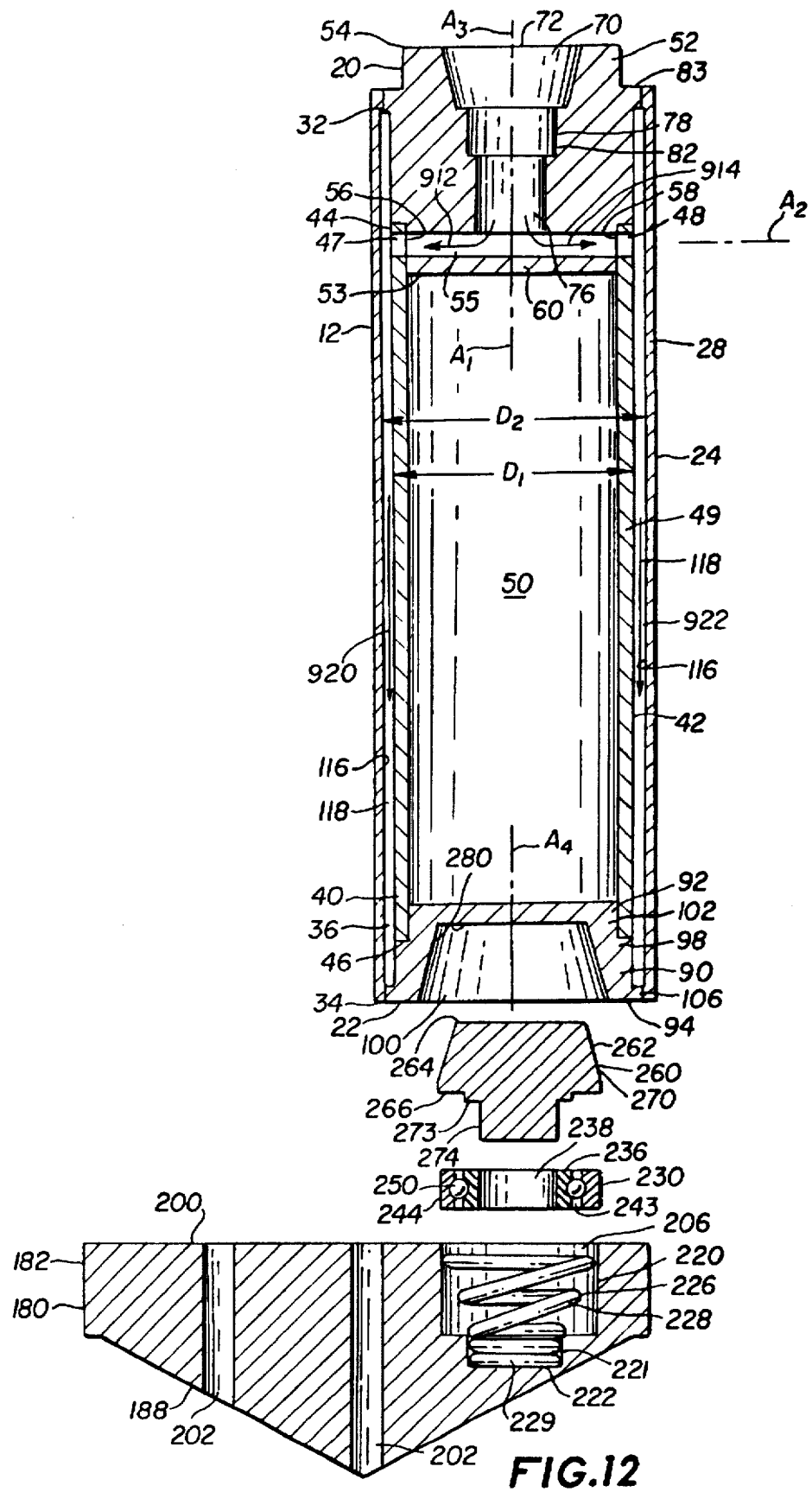
FIG. 12 is an exploded view (partially in cross-section) of a representative cartridge unit, cartridge unit support member, and components associated therewith which are used in the system of FIG. 10, wherein the flow of gas materials into the cartridge unit is schematically illustrated.

Regarding the structural design of each cartridge unit 12, 14, 16 in the system 10, the same type of design will be used as described above in the first embodiment of the system 10 in which solid materials were removed from liquids. With reference to FIG. 12, a cross-sectional view of cartridge unit 12 is illustrated. Cartridge unit 12 includes the same design features as the other cartridge units 14, 16 in the system 10, with the following discussion involving cartridge unit 12 being equally applicable to cartridge units 14, 16. As shown in FIG. 12, the cartridge unit 12 includes a tubular side wall portion 28 as discussed above. In the present embodiment, the side wall portion 28 will consist of a porous, gas-permeable material. Exemplary gas permeable materials suitable for this purpose will include but not be limited to the same materials described above in the first embodiment of the invention wherein the cartridge unit 12 was used for filtration purposes. In a preferred embodiment, the cartridge unit 12 will consist of sintered stainless steel which is commercially available under the name SIKA-FIL from Newmet Krebsoge, Inc. of Terryville, Conn. (USA) as previously described. Additional porous, gas-permeable compositions suitable for use in this embodiment of the invention will include but not be limited to the membrane materials listed above in connection with the system when used for filtration (e.g. membrane-type structures of the same general type described in U.S. Pat. Nos. 4,790,942; 4,867,878; 4,876,013; 4,906,379; 4,911,847; and 5,000, 848), as well as other sintered metal compositions (e.g. titanium, aluminum, tantalum, and the like). Sintering basically involves the adhesion of metallic particles to each other at temperatures below the melting point of the metals being used. As a result, a durable structure with microscopic pores is formed. A preferred metal used to produce the side wall portion 28 is sintered stainless steel as noted above. Such a material normally has a porosity of about 75–85%, with an average pore size ranging from about 3–100 microns depending on the production characteristics selected during the sintering process. Furthermore, commercially available porous forms of plastic (e.g. polystyrene, high density or low density polyethylene, polypropylene, methyl methacrylate, cellulose acetate, nylon, polyvinylchloride, and others) may be used to produce the side wall portion 28, as well as various conventional porous ceramics. In this regard, the present invention shall not be exclusively limited to the use of any particular materials for the purposes described above.

The remaining portions, components, and features of the system 10 used in this embodiment for gas diffusion will remain the same compared with the system 10 when used for filtration purposes as illustrated in FIGS. 1–9. For example, the same type of cartridge bearing system illustrated in FIG. 3 will be used (including the use of bearing member 230 and biasing member 226 associated with cartridge unit 12).

Operation of System in the Gas Diffusion Mode

To produce a gas-containing liquid product in accordance with the invention, a supply of a selected liquid or fluid 840 (FIG. 10) is placed within the primary housing 150 associated with the fluid containment chamber 822 so that the fluid 840 is in contact with and surrounding all of the cartridge units 12, 14, 16. The type of liquid composition to be used as fluid 840 will vary, with the present invention not being limited to any particular liquid compositions. Exemplary fluid materials and gases suitable for producing a gas-containing liquid product as discussed herein include but are not limited to the materials listed below in TABLE II:

TABLE II

| Fluid Composition | Gas to be used |
| --- | --- |
| Beer | $CO_2$ |
| Soft drink materials | $CO_2$ |
| Non-beer alcohol-containing malt beverages | $CO_2$ |
| Wort/malt mash use in producing brewed alcohol-containing beverages | $O_2$ |
| Liquid sewage-type wastes to be aerobically digested | $O_2$ |
| Liquid sewage-type wastes to be aerobically digested | air |
| Water to be purified | $O_3$ |
| Fermentation substrates to be used in producing alcohol-containing fuel materials | $O_2$ |
| Water used to support fish and other aquatic life | $O_2$ |
| Water used to support fish and other aquatic life | air |

Accordingly, the present invention shall not be limited to the use of any particular gas/fluid combinations.

To place the supply of fluid 840 in contact with the cartridge units 12, 14, 16 within the fluid containment chamber 822 (primary housing 150), many different methods may be used. For example, the primary housing 150 may be physically detached from the secondary housing 400 (using the retaining ring 550 discussed above), followed by manual introduction of the selected fluid 840 into the primary housing 150 so that the housing 150 is substantially but not entirely filled with the fluid 840. In a preferred embodiment, the primary housing 150 will be about ¾ filled with the fluid 840. During the introduction of fluid 840 in this manner, care must be taken to ensure that the outlet port 832 (FIG. 10) is sealed or blocked (e.g. by activation of the stopcock assembly 178 to close the drain conduit 177). The primary housing 150 is then reattached to the secondary housing 400 using the retaining ring 550 in order to close the fluid containment chamber 822.

Another and more preferred method of placing the fluid 840 in contact with the cartridge units 12, 14, 16 within the containment chamber 822 (primary housing 150) is illustrated in FIG. 10. This method involves placement of the fluid 840 in a storage tank 842 of conventional design (e.g. made of stainless steel having a glass lining if desired), with the storage tank 842 being operatively connected to the secondary inlet port 830 (conduit 163) using a separate tubular conduit 846. The conduit 846 includes a first end 850 and a second end 852 as illustrated. The first end 850 is connected to the storage tank 842, with the second end 852 being connected to the conduit 163 which functions as the secondary inlet port 830. The conduit 846 may also include an optional in-line pump 860 therein, depending on various factors, including the size of the system 10 and desired rate of fluid introduction as determined by preliminary pilot studies. If used, the pump 860 will be of conventional design including but not limited to standard positive displacement type units known in the art for fluid transfer. Alternatively, if the pump 860 is omitted, the fluid 840 may be delivered to the fluid containment chamber 822 via gravity through the conduit 846 and secondary inlet port 830 (e.g. conduit 163) provided that the storage tank 842 is suitably elevated relative to chamber 822. Regardless of which method is used, it is again preferred that the primary housing 150 associated with the chamber 822 be about ¾ filled with the selected fluid 840.

Next, the supply of gas 802 is introduced into the system 10 and supplied to the cartridge units 12, 14, 16. While introduction of the gas 802 preferably occurs after placement of the fluid 840 within the primary housing 150 of chamber 822, the gas 802 may also be introduced before or during addition of the fluid 840 to the primary housing 150. In this regard, all of these introduction methods shall be deemed functionally equivalent to each other. Notwithstanding the porous nature of cartridge units 12, 14, 16 used in the system 10 (e.g. the porous, gas-permeable character of the side wall portion 28 of cartridge unit 12 as discussed above and shown in FIG. 12), the infusion of fluid 840 into the cartridge units 12, 14, 16 prior to gas introduction will not occur to any appreciable extent. Because the system 10 is substantially closed between the cartridge units 12, 14, 16 and the supply of gas 802 within the gas storage container 800, the undesired passage of fluid 840 inwardly into the cartridge units 12, 14, 16 is substantially prevented due to internal, ambient gas pressures caused by air and/or preliminary amounts of gas 802 within the cartridge units 12, 14, 16 before the actual, complete delivery of gas 802 is initiated. Any of the fluid 840 which does, in fact, leak inwardly into the cartridge units 12, 14, 16 will most likely be expelled back into the primary housing 150 of chamber 822 upon the introduction of gas 802 into the system 10.

Figure 11:
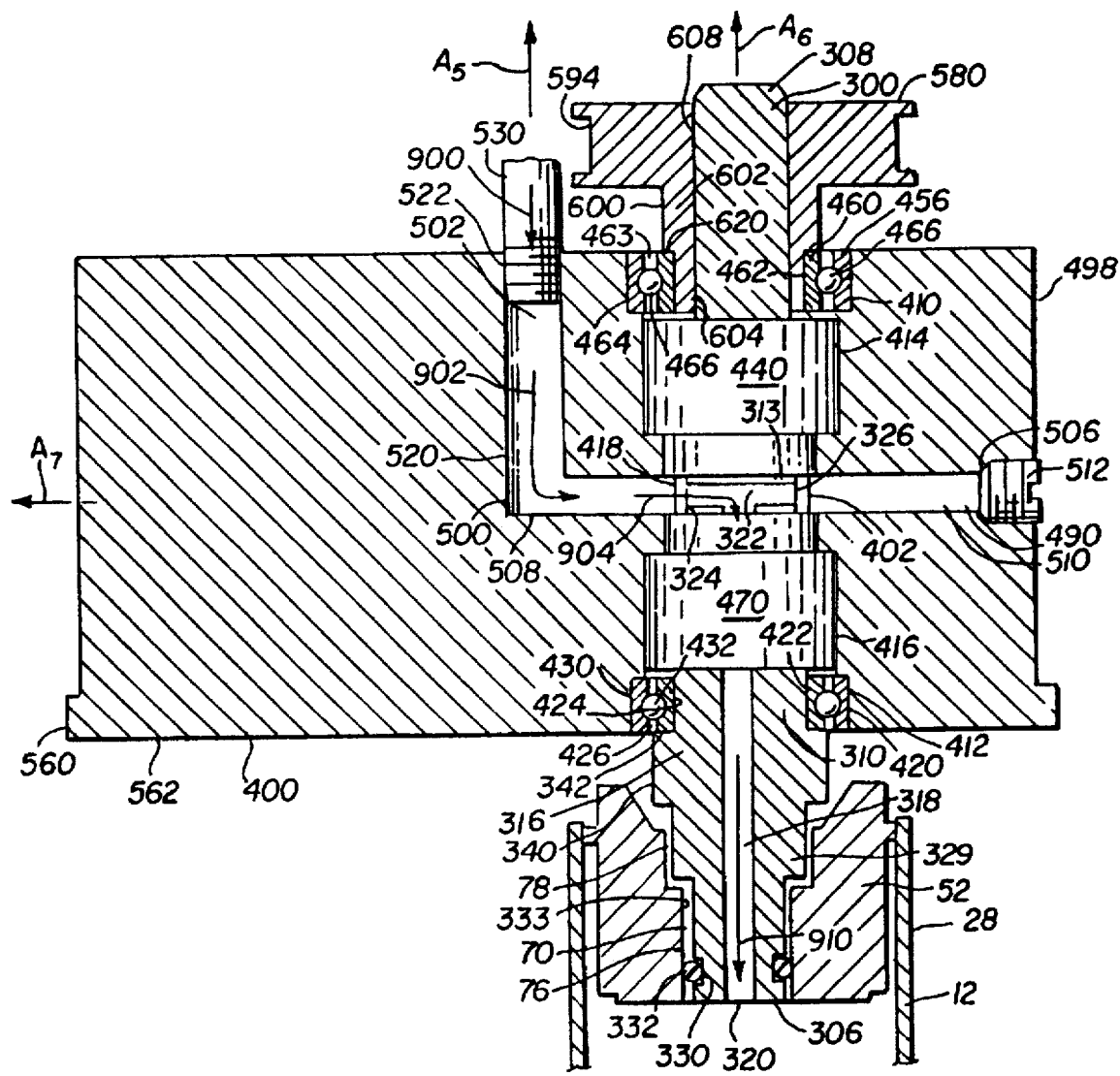
FIG. 11 is a cross-sectional view of the secondary housing in the system of FIG. 10 wherein the flow of gas materials within the system is schematically illustrated.

To introduce gas 802 into system 10, the gas 802 is routed from the storage container 800 through the conduit 808 (and pump 810 if used) so that the gas 802 enters the conduit 530 which functions as the primary inlet port 820. Thereafter, the flow of gas 802 through the system is schematically illustrated in FIGS. 11–12. While FIGS. 11–12 primarily illustrate the flow of gas 802 into cartridge unit 12, it shall be understood that the flow of gas 802 into cartridge units 14, 16 occurs in an equivalent manner. In addition, it is preferred that the gas 802 be introduced into the system 10 (e.g. the interior region 36 of cartridge unit 12) at a flow rate of about 13–15 ft³/min., although this value may be varied, depending on the particular fluid materials being treated and the dimensional parameters of the system 10.

With particular reference to FIG. 11, after the gas 802 enters the conduit 530 in the direction of arrow 900, it passes into bore 502 within the secondary housing 400 of chamber 822 in the direction of arrow 902. Thereafter, the gas 802 travels into passageway 490 and moves from the second end 508 thereof toward shaft member 300 associated with cartridge unit 12. The gas 802 then moves in the direction of arrow 904 into the bore 402 through secondary housing 400, and thereafter enters the bore 322 through shaft member 300 via port 324. Next, the gas 802 moves downwardly in the direction of arrow 910 through the bore 322 in the shaft member 300 until it reaches the upper cap member 52 of the cartridge unit 12.

With reference to FIG. 12, the gas 802 is now introduced into the interior region 36 of the cartridge unit 12. Specifically, after passing out of the opening 320 in the bore 322 at the first end 306 of shaft member 300 (FIG. 11), the gas 802 moves in the direction of arrows 912, 914 through the longitudinal bore 55 in the upper cap member 52. The gas 802 then leaves the upper cap member 52 via the open first end 56 and open second end 58 in the bore 55, with the gas 802 thereafter passing through openings 47, 48 in the core member 40. Finally, the gas 802 enters passageway 118 between the core member 40 and the side wall portion 28 of the cartridge unit 12 and travels downwardly in the direction of arrows 920, 922. Because the cartridge unit 12 is closed at the lower end 22 thereof, the gas 802 is forced (diffused) outwardly through the side wall portion 28 which is constructed of a porous, gas-permeable material as noted above. Accordingly, the gas 802 is uniformly delivered to the fluid 840 within the chamber 822 in the form of small bubbles (not shown) each having an average diameter of about 0.25–0.5 mm, depending on the particular gas-permeable material used to construct the cartridge unit 12.

It is important aspect of this process that each of the cartridge units 12, 14, 16 within the system 10 are rotated in unison simultaneously with the introduction of gas 802 into the interior regions of each cartridge unit 12, 14, 16 (e.g. the interior region 36 of cartridge unit 12). This process (simultaneous cartridge rotation and gas introduction) provides numerous substantial benefits, and is accomplished using the motor drive means/system described above. In particular, the motor 632 (FIGS. 1 and 8) is activated which causes movement of the belt 640 and pulley members 580, 582, 584, 634 attached thereto. As a result, the cartridge units 12, 14, 16 will rotate simultaneously at the same speed and direction. In a preferred embodiment, the motor 632 is adjusted so that it rotates the cartridge units 12, 14, 16 either clockwise or counterclockwise at a uniform speed of about 500–4000 rpm [2500 rpm=optimum].

While the system 10 is preferably operated using three cartridge units 12, 14, 16 arranged in a triangular configuration so that the cartridge units 12, 14, 16 are equidistantly spaced from each other by a distance not less than 0.1 inch (FIG. 7), the present invention shall not be exclusively limited to this mode. For example, a non-triangular arrangement of cartridge units may be employed in which the number of cartridge units is not confined to three, but instead may involve two or more units in many different arrangements. Furthermore, in a preferred embodiment involving three cartridge units 12, 14, 16 arranged in a triangular configuration, the motor drive means described above (e.g. the motor 632, belt 640, and pulley members 580, 582, 584, 634) may be configured to run all of the cartridge units 12, 14, 16 in a single direction (FIG. 8), or may be arranged so that one of the cartridge units (e.g. unit 16) is rotated in a different direction from the other two units (e.g. 12, 14) as shown in FIG. 9. Accordingly, the present invention shall not be limited to any particular rotational configuration involving the cartridge units 12, 14, 16.

Regarding the benefits provided by the delivery of gas 802 during cartridge unit rotation, rotational movement of the cartridge units 12, 14, 16 during the delivery of gas 802 creates considerable turbulence and fluid agitation around and between the cartridge units 12, 14, 16. This agitation greatly enhances the physical integration and dissolution of the gas 802 into the fluid 840 within the system 10 compared with stationary, non-rotational gas delivery systems. In particular, the fluid turbulence and agitation generated within system 10 as described above creates conditions in which molecular bonding and surface tension characteristics of the fluid 840 and gas 802 are favorably altered to facilitate gas dissolution. As a result, a substantial amount of gas can be rapidly dispersed within a given amount of fluid over a minimal time period compared with gas diffusion systems involving stationary (non-rotational) gas distribution components.

Fluid agitation around and between the cartridge units 12, 14, 16 also creates a "self-cleaning" function as previously noted wherein extraneous solid materials in the fluids being treated are prevented from adhering to the exterior surfaces of each cartridge unit. In this manner, extraneous solids are effectively scrubbed from the side wall portion of each cartridge unit. For example, if the system 10 is used in connection with a supply of gaseous carbon dioxide to carbonate alcohol-containing beverage materials (e.g. beer) to produce a carbonated beverage product, rotational movement of the cartridge units 12, 14, 16 will prevent the build-up of organic film-forming materials thereon. As a result, a constant passage of gaseous materials through the cartridge units 12, 14, 16 is ensured, without the need to repeatedly deactivate the system 10 for cleaning. All of these benefits are achieved to an even greater degree if a triangular arrangement of cartridge units 12, 14, 16 is used as shown in FIG. 7. This particular arrangement provides an especially high degree of fluid agitation, especially within the center zone 799 between all of the rotating cartridge units 12, 14, 16 (FIG. 7). The enhanced degree of fluid turbulence within the center zone 799 correspondingly generates strong fluid currents and fluid agitation in other portions of the system which provides enhanced gas diffusion and self-cleaning capabilities. These enhanced capabilities are also the result of higher fluid pressure levels within the center zone 799 which causes additional fluid flow, gas diffusion, and self-cleaning down the central axis of the primary housing 150.

As a result of the foregoing process, a liquid product 930 having the gas 802 dissolved therein is generated which is removed from the system 10 and collected. With reference to FIG. 10, the liquid product 930 is collected within a tank 932 of conventional design (e.g. made of stainless steel and optionally glass-lined). Specifically, the liquid product 930 within the primary housing 150 of the fluid containment chamber 822 passes downwardly through the drainage bores 202 in the cartridge unit support member 180 (FIG. 10), into the open center zone 190 in the bottom portion 170 of the chamber 160 within the primary housing 150, and outwardly from the system 10 by gravity through the drain conduit 177 and associated stopcock assembly 178. As previously indicated, the drain conduit 177 and stopcock assembly 178 collectively constitute an outlet port 832 from which the liquid product 930 is received. The liquid product 930 is then gravitationally routed via a tubular conduit 934 into the tank 932. The conduit 934 includes a first end 936 connected to the tank 932 and a second end 940 connected to the drain conduit 177 as illustrated in FIG. 10.

Operation of the system 10 in the gas diffusion mode provides numerous benefits as discussed above. These benefits are directly achieved by the simultaneous introduction of gas into system 10 during rotational movement of the multiple, closely-spaced cartridge units as discussed above. Accordingly, this embodiment of the invention represents an advance in the art of liquid treatment in which a gas-containing liquid product is produced in a rapid and complete manner with minimal system down-time.

C. Enhanced Cleaning Mode

During use of the fluid treatment system 10 to filter solid materials from a selected fluid (liquid or gas) as discussed above, solid waste matter (e.g. debris) may collect on the side wall portions associated with the cartridge units 12, 14, 16 illustrated in FIG. 1. For example, with reference to cartridge unit 12, debris may collect on the side wall portion 28 (FIG. 3), thereby blocking fluid flow therethrough. The same situation will occur regarding cartridge units 14, 16, with any reference to one of the cartridge units 12, 14, 16 in this section being entirely applicable to the remaining cartridge units in the system 10. This debris may involve many different materials ranging from extraneous solid waste matter in the fluids being treated to viscous gel-type materials of biological origin which are normally encountered when microorganism-derived fluids are being processed. Likewise, in the production and filtration of beverage materials (e.g. brewed beverages and soft drinks) an organic-based sugar-containing film composition may form directly on the cartridge units 12, 14, 16 during operation of the system 10. Bacteria and other microorganisms may likewise produce an organic residue when sewage and other microorganism-containing fluids are treated using the system 10. Accordingly, these and other types of waste material (e.g. collectively designated herein as "debris") may adhere to the filter cartridge units 12, 14, 16 in the system 10, with the present invention not being limited to the removal of any particular materials.

As noted above in connection with the fluid treatment system 10 illustrated in FIGS. 1–9, the rotating action of the cartridge units 12, 14, 16 provides a unique and highly effective self-cleaning function. Such capabilities result from simultaneous rotation of the multiple cartridge units 12, 14, 16 which generates a high level of fluid turbulence within the system 10. This level of turbulence controls the accumulation of solid materials on the exterior surfaces of the cartridge units 12, 14, 16. As a result, filtration efficiency is substantially improved due to (1) a greater flow rate through the cartridge units 12, 14, 16 which do not experience the rapid accumulation of solids thereon as in single cartridge systems; and (2) a reduction in the amount of system down-time that is needed for removing accumulated solids (which is significant in single cartridge systems compared with the present invention). All of these benefits are achieved to an even greater extent if a triangular arrangement of cartridge units 12, 14, 16 is used as shown in FIG. 7. This specific arrangement provides an especially high degree of fluid agitation, particularly within the open center zone 799 between all of the rotating cartridge units 12, 14, 16 (FIG. 7). The considerable degree of fluid turbulence within the open center zone 799 correspondingly generates strong fluid currents and fluid agitation in other portions of the system 10 which provide substantial filtration and self-cleaning capabilities.

However, in certain cases as determined by preliminary pilot studies on the materials being filtered, additional (enhanced) cleaning of the outer surfaces (side wall portions) of the cartridge units 12, 14, 16 will provide a greater degree of filtration efficiency and a corresponding reduction in the amount of system down-time which is needed to clean the exterior surfaces of the cartridge units 12, 14, 16. This goal may be achieved by the use of an auxiliary cleaning system which physically removes or "wipes" debris from the cartridge units 12, 14, 16. In many situations, it cannot be determined in advance when the use of an auxiliary cleaning system is appropriate. There are many factors which will determine the need for such a system including (1) the type of fluid being filtered; (2) the viscosity of the fluid to be treated; (3) the total amount of solids to be removed from the fluid; (4) the chemical nature of the solids (e.g. whether they are of organic, synthetic, or biological origin); and (5) the amount of fluid to be treated in a given time period. Taking all of these factors into consideration, preliminary pilot studies can be run over a given time period to determine whether an auxiliary cleaning system is needed or warranted. Alternatively, the auxiliary cleaning systems described below can be positioned within the system 10 and allowed to remain therein at all times should a spontaneous need for additional cleaning capabilities arise because of a sudden change in the physical make-up of the fluids being processed. In this regard, the auxiliary cleaning systems discussed herein shall not be limited to the treatment of any particular fluids and, in most cases, will provide enhanced cleaning of the cartridge units 12, 14, 16 regardless of the materials being processed. Likewise, while the system 10 in this embodiment of the present invention will be primarily discussed with reference to the removal of solid materials from liquids, the term "fluid" as used herein shall also encompass gaseous materials in addition to liquids. In this regard, the claimed system and wiping assembly associated therewith can be used to (1) remove solid materials from liquids; and (2) remove solid particles and the like (e.g. dust particles) from gases introduced into the system.

As discussed below, this embodiment of the present invention involves the use of a wiping system in which wiping members are used to physically "wipe" or "rub" the exterior surfaces of the cartridge units 12, 14, 16 during system operation (e.g. side wall 28 of cartridge unit 12 for example). One or more of the cartridge units 12, 14, 16 can be wiped in accordance with the claimed invention, although it is preferred that all of the units 12, 14, 16 be wiped simultaneously to achieve optimum results. This preferred operating mode will be applicable regardless of how many cartridge-type filtration units are used in the system 10. Furthermore, many different components, hardware items, and other materials may be used in connection with the claimed wiping system, with the present invention not being limited to any particular materials for this purpose. It should also be noted that all of the information, components, and operational characteristics described above in connection with the fluid treatment (filtration) system 10 shown in FIGS. 1-9 shall be applicable to the present alternative embodiment illustrated in FIGS. 13-19 unless otherwise indicated.

Figure 15:
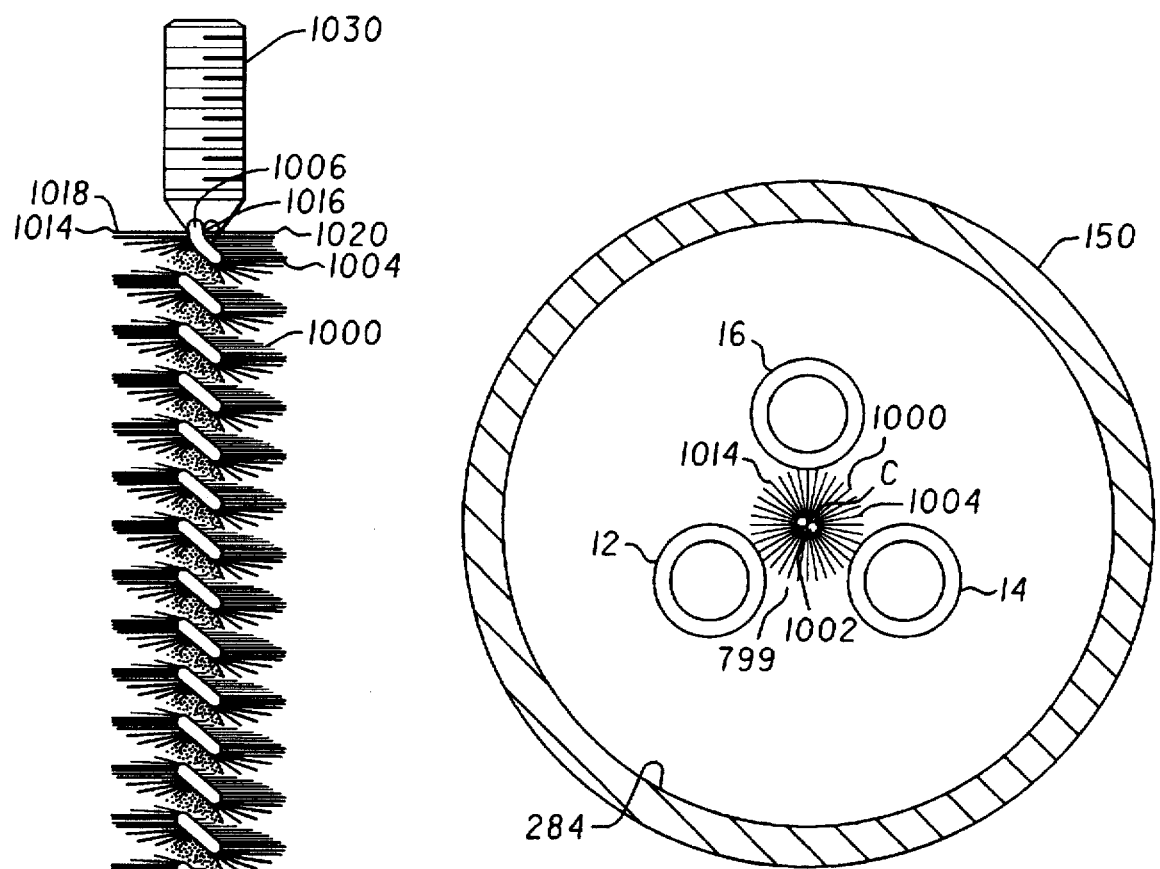
FIG. 15 is a schematic cross-sectional view of the primary housing in the system of FIG. 1 having the cartridge wiping assembly of FIG. 13 positioned therein adjacent the filter cartridge units.
Figure 13:
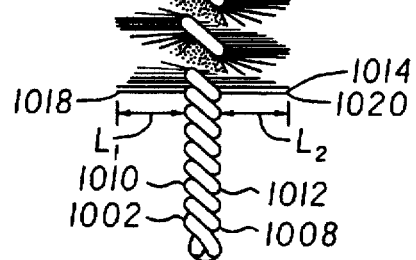
FIG. 13 is side elevational view of a cartridge wiping assembly suitable for use in the multi-cartridge fluid treatment system of FIG. 1.
Figure 14:
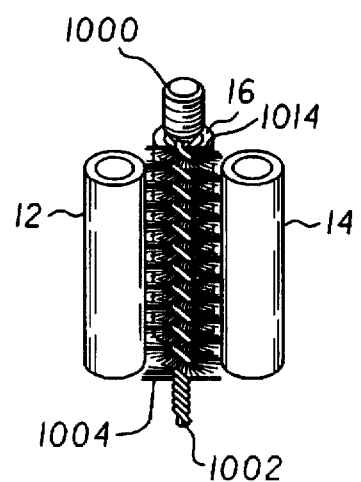
FIG. 14 is a schematic perspective view of the cartridge wiping assembly of FIG. 13 surrounded by a plurality of filter cartridge units in a triangular arrangement.

A first embodiment of an auxiliary cleaning system suitable for use in system 10 is illustrated in FIGS. 13-15. With reference to FIG. 13, a cartridge wiping assembly 1000 is shown which is used to remove collected debris from the exterior surfaces of the cartridge units 12, 14, 16 (e.g. the side wall portion 28 of cartridge unit 12). In the embodiment of FIG. 13, the cartridge wiping assembly 1000 consists of an elongate vertical support member 1002 which includes a plurality of flexible, outwardly-extending wiping members 1004 thereon (discussed further below). The support member 1002 further includes an upper end 1006 and a lower end 1008 as shown (FIG. 13). To achieve optimum results, the support member 1002 will have a length which is at least as long as the cartridge units 12, 14, 16 to be cleaned by the cartridge wiping assembly 1000 (FIG. 14). The vertical support member 1002 should also have a length and thickness which will enable it to fit vertically within the primary housing 150. However, the claimed invention shall not be limited to a support member 1002 of any particular length. As further discussed below, it is likewise preferred that the wiping members 1004 be positioned continuously along most or all of the length of support member 1002 to ensure complete and uninterrupted cleaning of the cartridge units 12, 14, 16.

As noted above, the wiping members 1004 are secured to the vertical support member 1002 which, in turn, is fixedly secured to and within the primary housing 150 at a position adjacent the cartridge units 12, 14, 16. In this manner, the wiping members 1004 are effectively attached to and within the housing 150 so that they will remain stationary (e.g. non-rotating) during system operation. The wiping members 1004 are again used to provide an enhanced self-cleaning function in addition to the scrubbing action caused by the rotational movement of the cartridge units 12, 14, 16. Many different structures many be used in connection with the wiping members 1004 and the vertical support member 1002 as previously indicated. Accordingly, the present invention shall not be exclusively limited to any particular structural designs regarding these components provided that the general concept associated with this embodiment of the invention is employed in the system 10. This general concept again involves the use of elongate wiping members 1004 secured to and within the housing 150 adjacent the cartridge units 12, 14, 16 so that the side wall portion of each cartridge unit is placed in direct contact with at least one of the wiping members 1004. However, FIG. 13 illustrates a non-limiting representative embodiment of various components which may be used to achieve this goal.

In the embodiment of FIG. 13, the vertical support member 1002 specifically consists of an elongate first support wire 1010 and an elongate second support wire 1012 which are wound together to form a helical, "intertwined" configuration illustrated in FIG. 13. The first and second support wires 1010, 1012 are preferably made from a number of different substantially inert metals including copper, aluminum, and stainless steel. However, the selection of any given construction materials for components within the system 10 (including the cartridge wiping assembly 1000) will necessarily depend on the fluids (liquids or gases) being treated as determined by preliminary pilot studies. In the embodiment of FIG. 13, the multiple wiping members 1004 will consist of a plurality of elongate flexible bristles 1014 which are fixedly engaged between the helically-wound first and second support wires 1010, 1012. The term "bristle" as used herein shall involve an elongate, filamentous member of the type shown in FIG. 13 having a flexible, hair-like character. To construct the cartridge wiping assembly 1000 of FIG. 13, the midpoint 1016 of each bristle 1014 is positioned between and against the first and second support wires 1010, 1012 which are then twisted together with the bristles 1014 engaged therebetween. In this configuration, the bristles 1014 extend outwardly from the vertical support member 1002. The bristles 1014 are thereafter retained in position as illustrated in FIG. 13 by frictional engagement between the first and second support wires 1010, 1012.

Each of the bristles 1014 may be made from a variety of different materials including but not limited to plastic (e.g. synthetic polymeric materials), rubber, fabric, and natural animal fiber materials (e.g. animal fur or individual animal hairs). Representative and preferred plastic materials suitable for this purpose include nylon, polypropylene, polyethylene, polycarbonate, and polytetrafluoroethylene (e.g. Teflon®) However, the present invention shall not be limited to any particular construction materials in connection with the wiping members 1004 (bristles 1014). In a preferred embodiment as noted above, the bristles 1014 will be elongate and filamentous in character with a substantially circular cross-section. A representative diameter (thickness) associated with each of the bristles 1014 in the embodiment of FIG. 13 will be substantially equivalent to the diameter (thickness) of a human hair. Likewise, in the embodiment of FIG. 13, each bristle 1014 will have a first outer end 1018 and a second outer end 1020, with the midpoint 1016 being positioned therebetween. The dimensional characteristics of the bristles 1014 will vary in accordance with the size of the system 10 and other factors.

With continued reference to FIG. 13 the length "$L_1$" between the first outer end 1018 of each bristle 1014 and the vertical support member 1002 is substantially equal to the length "$L_2$" between the second outer end 1020 of each bristle 1014 and the support member 1002. The numerical values associated with $L_1$ and $L_2$ (e.g. the degree to which the bristles 1014 extend outwardly from the vertical support member 1002) will depend on numerous factors including (1) the size of the entire system 10; (2) the size (diameter) of the filter cartridge units 12, 14, 16 employed within the system 10; (3) the number of filter cartridge units 12, 14, 16 used in the system 10; (4) the distance between the filter cartridge units 12, 14, 16; and (5) the proximity of the vertical support member 1002 which contains the wiping members 1004 to the cartridge units 12, 14, 16 in the system 10. The values associated with $L_1$ and $L_2$ will vary from system to system, and will therefore be determined in accordance with the factors listed above. Regardless of these factors, the length values $L_1$ and $L_2$ associated with the bristles 1014 (and any other types of wiping members 1004 in bristle or non-bristle form) should be sufficient to enable them to come in direct physical contact with the outer surfaces of the cartridge units 12, 14, 16 during system operation. Thus, the length parameters associated with the wiping members 1004 are not critical, provided that the wiping members 1004 directly engage the cartridge units 12, 14, 16 to ensure that proper cleaning occurs. In the small scale system 10 of FIGS. 1–9 having the dimensional characteristics and other features described above in section "A", a representative and appropriate value for $L_1$ and $L_2$ in connection with the bristles 1014 will be about 0.20–0.50 inches, with nylon bristles 1014 being preferred. However, the present invention shall not be limited to these parameters which may be varied as discussed above in accordance with the desired size of the system.

It is also preferred that the wiping members 1004 (e.g. bristles 1014) extend outwardly from the vertical support member 1002 so that they are perpendicular to the support member 1002 (FIG. 13). In addition, the wiping members 1004 (regardless of form) should be provided in sufficient number to extend continuously from the upper end 1006 of the support member 1002 to the lower end 1008. This configuration is evident in the embodiment of FIG. 13 wherein the bristles 1014 extend continuously in a helical pattern from the upper end 1006 of the support member 1002 to the lower end 1008.

With reference to FIGS. 6, 14, and 15, the vertical support member 1002 with attached wiping members 1004 (regardless of form) is secured to and within the primary housing 150 adjacent to and parallel with the filter cartridge units 12, 14, 16. While FIG. 6 illustrates the wiping members 1004 (e.g. bristles 1014) against the side wall portion 28 of cartridge unit 12, the side wall portion of each cartridge unit 12, 14, 16 will be positioned against and in direct contact with at least one of the wiping members 1004 as shown in FIG. 14. Thus, the location of vertical support member 1002 will vary depending on the number and arrangement of filter cartridge units within a given filtration system (which may be different from the system 10 shown in FIGS. 1–9). Any location may be chosen provided that the wiping members 1004 on the support member 1002 directly contact the cartridge units 12, 14, 16. However, in a preferred embodiment which involves three cartridge units 12, 14, 16 positioned within a triangular arrangement as shown in FIGS. 7 and 15, the vertical support member 1002 will be located within the open center zone 799 surrounded by the cartridge units 12, 14, 16. FIG. 15 specifically illustrates the cartridge units 12, 14, 16 and the wiping assembly 1000 mounted within the housing 150 of the system 10. In the triangular arrangement of FIGS. 7 and 15, each of the cartridge units 12, 14, 16 is spaced equidistantly from each other in order to form the open center zone 799 surrounded by the cartridge units 12, 14, 16 as noted above. To effectively clean the cartridge units 12, 14, 16 in this triangular arrangement, the vertical support member 1002 is oriented within the open center zone 799 so that each of the cartridge units 12, 14, 16 is positioned against and in direct contact with at least one of the wiping members 1004 on the support member 1002. Optimum results will be achieved in the embodiment of FIGS. 13–15 if the vertical support member 1002 is positioned at a location precisely within the center "C" of the open center zone 799 so that the support member 1002 is spaced equidistantly from each of the cartridge units 12, 14, 16. This configuration is shown in FIG. 14 wherein each of the cartridge units 12, 14, 16 is in physical contact with one or more of the wiping members 1004 (e.g. bristles 1014). During rotation of the cartridge units 12, 14, 16, the wiping members 1004 will wipe (rub) against the exterior surfaces of the cartridge units 12, 14, 16 to remove collected debris therefrom.

As previously indicated, the vertical support member 1002 and attached wiping members 1004 of the cartridge wiping assembly 1000 are fixedly secured in position within the primary housing 150 adjacent the cartridge units 12, 14, 16. Attachment is undertaken in a manner which prevents the rotational and axial movement of the cartridge wiping assembly 1000 during system operation. Many different methods may be used to attach the cartridge wiping assembly 1000 in a vertical, fixed position parallel to the cartridge units 12, 14, 16 (FIG. 14), and the present invention shall not be limited to any particular attachment system. With reference to FIG. 13, a representative attachment system for the vertical support member 1002 of the cartridge wiping assembly 1000 is illustrated. A threaded plug 1030 is provided which is fixedly secured to (or integrally formed on) the upper end 1006 of the support member 1002. If a separate plug 1030 is used which is physically attached to the vertical support member 1002, the plug 1030 may be secured to the support member 1002 (e.g. the first and second support wires 1010, 1012) by welding, adhesives, or other conventional fastening methods. To mount the vertical support member 1002 and attached wiping members 1004 in position within the primary housing 150, a complementary, internally threaded bore 1032 is provided within the bottom surface 562 of the secondary housing 400 as illustrated in FIG. 6. In the embodiment of FIGS. 1–15, the bore 1032 is positioned at the center "$C_1$" of the secondary housing 400 so that the cartridge wiping assembly 1000 is precisely centered within the open center zone 799 between the cartridge units 12, 14, 16 as illustrated in FIG. 15.

To mount the cartridge wiping assembly 1000 (e.g. the vertical support member 1002) in position, the threaded plug 1030 is threadably engaged within the threaded bore 1032 in a secure and tight manner. As a result, the cartridge wiping assembly 1000 is securely retained in position. In the embodiment of FIG. 13, the lower end 1008 of the vertical support member 1002 is unattached to any physical structures. While the attachment methods and components illustrated in FIGS. 6 and 13 will provide effective results, the vertical support member 1002 may also include an optional threaded plug (not shown) secured to the lower end 1008 thereof which would be engaged within a complementary threaded bore (not shown) in the cartridge unit support member 180 attached to the housing 150. The use of an optional threaded plug at the lower end 1008 may be provided instead of or in addition to the plug 1030 used at the upper end 1006 of the support member 1002. Furthermore, as noted above, other conventional attachment systems may be employed in connection with the cartridge wiping assembly 1000 and the other cartridge wiping systems disclosed herein. In this regard, the present invention shall not be limited to any particular attachment methods or hardware.

Use of the cartridge wiping assembly 1000 illustrated in FIG. 13 and described above will provide an enhanced level of cleaning within the system 10 (especially when highly turbid liquids are being filtered). The life span of the cartridge wiping assembly 1000 and attached wiping members 1004 will depend on numerous factors including the type of materials being used in connection with the wiping members 1004 (e.g. bristles 1014), the surface characteristics of the cartridge units 12, 14, 16, and the accumulated operating time of the system 10. The point at which replacement of the cartridge wiping assembly 1000 is necessary can be readily determined by visual inspection of the wiping members 1004. If the wiping members 1004 (e.g. bristles 1014 in the embodiment of FIG. 13) are sufficiently worn to prevent complete contact of the wiping members 1004 with the cartridge units 12, 14, 16, then replacement of the cartridge wiping assembly 1000 is warranted. Replacement is accomplished by reversing the steps used to initially secure the cartridge wiping assembly 1000 to and within the housing 150.

As previously noted, the claimed invention shall not be limited to the structures and components illustrated in FIG. 13. Other components and materials may be used in connection with the vertical support member 1002 and wiping members 1004 which will provide equally effective results. For example, the vertical support member 1002 may simply consist of a single rod or shaft (not shown) with a circular or non-circular cross-section. The shaft may be made from any durable materials including the metal compositions listed above, plastic (e.g. polyethylene, polystyrene, or polycarbonate plastic), hardened rubber, or other similar compositions. The wiping members 1004 may involve many different shapes and forms ranging from the bristles 1014 shown in FIG. 13 to outwardly-extending strip-like structures, flexible blades, tufts or clusters of non-linear flexible elements, and other similar components. In this regard, the exact configuration of the wiping members 1004 may vary, provided that the selected structures are capable of effectively wiping collected debris from the outer surfaces of the cartridge units 12, 14, 16. The wiping members 1004 may also be made from many different materials ranging from plastic, rubber, fabric, and natural animal fiber materials (e.g. animal hair or fur). The wiping members 1004 (regardless of form or content) can also be secured to the vertical support member 1002 or other support structure using many different attachment materials including conventional mechanical fasteners (screws, rivets, and the like) and adhesives (cyanoacrylate or epoxy compositions). Finally, the wiping members 1004 can be attached to and within the housing 150 without using the vertical support member 1002 or comparable structures. The wiping members 1004 may instead be secured by adhesives (cyanoacrylate or epoxy compositions) or conventional mechanical fasteners (screws, rivets, and the like) directly to the interior surface 284 (FIG. 15) of the housing 150 at a position which enables the cartridge units 12, 14, 16 to directly contact the wiping members 1004.

An alternative embodiment of the claimed cartridge cleaning system is illustrated in FIGS. 16–19. With reference to FIG. 16, an alternative cartridge wiping assembly 1050 is shown. All of the capabilities, attributes, and characteristics of the wiping assembly 1050 are substantially identical to those associated with the cartridge wiping assembly 1000 described above. However, the cartridge wiping assembly 1050 includes many different structural features which provide numerous benefits including rapid removal and replacement of the wiping members used in the wiping assembly 1050.

As shown in FIG. 16, the cartridge wiping assembly 1050 includes a vertical support member 1052. In a preferred embodiment the vertical support member 1052 will have a length which is substantially equal to the length of the cartridge units 12, 14, 16. The vertical support member 1052 should also have a length and thickness which will enable it to fit vertically within the primary housing 150. Representative construction materials suitable for producing the support member 1052 include plastic, copper, steel, aluminum, hardened rubber and other comparable materials. While the vertical support member 1052 illustrated in FIGS. 16–19 is circular in cross-section, other cross-sectional configurations may also be used (e.g. square, rectangular, and the like). As discussed further below, the support member 1052 is secured to and within the primary housing 150 adjacent the filter cartridge units 12, 14, 16.

The vertical support member 1052 (which is rod-like in the embodiment of FIG. 16) includes an upper end 1054, a lower end 1056, and a medial section 1058 therebetween. In the system of FIG. 16, the upper end 1054 has a threaded section 1060, the function of which will be discussed below. Secured to the outer surface 1062 of the support member 1052 along the medial section 1058 are a plurality of flexible, outwardly-extending wiping members 1064. In the embodiment of FIG. 16, the wiping members 1064 are arranged in a plurality of separate vertical rows 1066 which are spaced apart from each other along the vertical support member 1052. To achieve optimum results, one row 1066 of wiping members 1064 will be provided for each cartridge unit 12, 14, 16 within the system 10. Each of the rows 1066 is slightly shorter than the vertical support member 1052 and preferably extends upward from the lower end 1056 along the entire length of the medial section 1058 of the support member 1052 as illustrated. With reference to FIG. 16, each row 1066 of wiping members 1064 stops immediately before the threaded section 1060 of the upper end 1054. It is preferred that the wiping members 1064 in each row 1066 extend continuously along the vertical support member 1052 without any substantial gaps between individual wiping members 1064 to ensure complete and uninterrupted cleaning of the cartridge units 12, 14, 16 in the system 10.

As noted above, the rows 1066 of wiping members 1064 are attached to the vertical support member 1052 which, in turn, is fixedly secured to and within the primary housing 150 at a position adjacent the cartridge units 12, 14, 16. In this manner, the wiping members 1064 are maintained in a fixed position within the housing 150 so that they will remain stationary during system operation as discussed below. The wiping members 1064 are again used to provide a self-cleaning function in addition to the scrubbing action of the rotating cartridge units 12, 14, 16.

Many different components may be used in connection with the wiping members 1064 and the vertical support member 1052 as previously indicated. Accordingly, the claimed invention shall not be limited to any particular structural designs regarding these components provided that the general concept associated with this embodiment of the invention is employed in the system 10. This general concept again involves the use of multiple wiping members 1064 secured to and within the housing 150 adjacent the cartridge units 12, 14, 16 so that the side wall portion of each cartridge unit is placed in direct contact with at least one of the wiping members 1064. However, FIG. 16 illustrates a non-limiting representative embodiment of various components which may be used to achieve this goal.

In the embodiment of FIG. 16, the wiping members 1064 will consist of a plurality of elongate, flexible bristles 1068 of the same type and size characteristics listed above in connection with the bristles 1014 illustrated in FIG. 13. Each of the bristles 1068 may be produced from many different materials including but not limited to plastic, rubber, fabric, and natural animal fiber materials (e.g. animal fur or individual hairs). Representative and preferred plastic materials suitable for this purpose include nylon, polypropylene, polyethylene, polycarbonate, and polytetrafluoroethylene (e.g. Teflon®). However, the claimed invention shall not be limited to any specific construction materials in connection with the wiping members 1064 (bristles 1068). In a preferred embodiment, the bristles 1068 are elongate and filamentous in character with a substantially circular cross-section. A representative diameter (thickness) associated with each of the bristles 1068 in the embodiment of FIG. 16 will be substantially equivalent to the diameter (thickness) of a human hair. Likewise, in the system of FIG. 16, each bristle 1068 will have an outer end 1070 and an inner end 1072. The specific dimensional characteristics of the bristles 1068 will vary in accordance with the size of the system 10 and other factors as further discussed below.

With continued reference to FIG. 16, the wiping members 1064 are arranged in individual rows 1066 which extend along the medial section 1058 of the support member 1052 as previously noted. To form the individual rows 1066 of wiping members 1064 (bristles 1068), each row 1066 consists of a separate brush assembly 1074, one of which is shown separately from the other components in the cartridge wiping assembly 1050 illustrated in FIG. 16. Each brush assembly 1074 includes a longitudinal retaining strip 1076. The bristles 1068 are attached to the strip 1076 and extend outwardly therefrom. The strip 1076 may be made from many different construction materials including metal (e.g. aluminum, steel, tin, or copper) and plastic (e.g. polystyrene, polyethylene, or polyethylene compositions). The bristles 1068 can be secured to the retaining strip 1076 in the linear arrangement of FIGS. 16–17 using many different techniques, with the present invention not being limited to any given attachment methods. However, in a preferred embodiment as illustrated in FIGS. 16–17, each retaining strip 1076 is manufactured from a deformable metal (e.g. aluminum, tin, etc.) and includes an elongate first panel 1078, an elongate second panel 1090 (which is substantially parallel to the first panel 1076), and an intermediate bridge portion 1092 securing the first panel 1078 to the second panel 1090 (FIG. 17). As a result, a gap 1094 is created between the first panel 1078 and the second panel 1090. It is likewise preferred that each retaining strip 1076 be manufactured as a single component (e.g. of unitary, one-piece construction).

To secure the wiping members 1064 (e.g. bristles 1068) to the retaining strip 1076, the inner ends 1072 of the bristles 1068 are positioned within the gap 1094 between the first panel 1078 and the second panel 1090 of the retaining strip 1076. If desired, an optional adhesive (e.g. a cyanoacrylate or epoxy composition known in the art) may be positioned within the gap 1094 along with the inner ends 1072 of the bristles 1068 although the use of an adhesive is not required. Thereafter, the first panel 1078 and the second panel 1090 are forcibly urged together in order to engage the inner ends 1072 of the bristles 1068 between the first and second panels 1078, 1090. The use of a deformable metal as described above will enable permanent deformation of the retaining strip 1076 so that the first and second panels 1078, 1090 will fixedly engage the bristles 1068 therebetween. However, other methods may be used to produce the brush assemblies 1074 with the materials and components shown in FIGS. 16–17 representing a single, non-limiting embodiment.

As illustrated in FIGS. 16–17, all of the bristles 1068 on each of the brush assemblies 1074 will have a substantially equivalent length "$L_3$" (FIG. 16) between the outer end 1070 of each bristle 1068 and the retaining strip 1076. The numerical values associated with $L_3$ (e.g. the degree to which the bristles 1068 extend outwardly from the brush assemblies 1074) will again depend on numerous factors including (1) the size of the entire system 10; (2) the size (diameter) of the filter cartridge units 12, 14, 16 employed within the system 10; (3) the number of filter cartridge units 12, 14, 16 used in the system 10; (4) the distance between the filter cartridge units 12, 14, 16; and (5) the proximity of the vertical support member 1052 which contains the wiping members 1064 to the cartridge units 12, 14, 16 in the system 10. The values associated with $L_3$ will therefore vary from system to system and will be determined in accordance with the factors listed above. Regardless of these factors, the $L_3$ values associated with the bristles 1068 (and any other wiping members 1064 in bristle or non-bristle form) should be sufficient to enable the wiping members 1064 to come in direct physical contact with the outer surfaces of the cartridge units 12, 14, 16 during system operation. Thus, the values associated with the respective lengths $L_3$ of the wiping members 1064 in the embodiment of FIGS. 16–19 are not critical, provided that the wiping members 1064 directly contact the cartridge units 12, 14, 16 to ensure that proper cleaning takes place. In the small scale system 10 of FIGS. 1–9 having the dimensional characteristics and other features described above in section "A", a representative and appropriate value for $L_3$ in connection with the bristles 1068 will be about 0.20–0.50 inches, with nylon bristles 1068 being preferred. However, the present invention shall not be limited to these parameters which may be varied as discussed above in accordance with the desired size of the system.

It is likewise preferred that the wiping members 1064 (e.g. bristles 1068) extend outwardly from the vertical support member 1052 so that they are perpendicular thereto. In addition, as previously noted, it is also preferred that the wiping members 1064 (regardless of form) be provided in sufficient number to extend continuously along each of the rows 1066 without any substantial gaps or interruptions between the wiping members 1064. Regarding the number of bristles 1068 to be secured in position within each retaining strip 1076, it is preferred that as many bristles 1068 as possible be used to enable complete and thorough wiping of the cartridge units 12, 14, 16.

Many different methods may be used to secure the brush assemblies 1074 in position on the vertical support member 1052. For example, each brush assembly 1074 may be attached to the vertical support member 1052 in a parallel orientation using adhesive materials (e.g. cyanoacrylate or epoxy compositions), conventional mechanical fasteners (e.g. rivets, screws, and the like) or by welding if metal components are used in connection with the support member 1052 and the brush assemblies 1074. Regardless of which attachment method is employed, each row 1066 of wiping members 1064 (e.g. each brush assembly 1074) should be secured in position so that it is parallel to the vertical support member 1052.

With continued reference to FIGS. 16–17 a representative alternative method for attaching the brush assemblies 1074 in position is illustrated. Specifically, a plurality of elongate channel members 1096 are provided which are secured to the vertical support member 1052. As shown in FIG. 16, the channel members 1096 are each attached in position so that they are substantially parallel to the support member 1052. In a preferred embodiment, each channel member 1096 is manufactured from the same materials used to produce the support member 1052 (e.g. plastic, copper, steel, aluminum, hardened rubber and other comparable materials). The channel members 1096 may be secured in position by conventional attachment methods depending on the materials which are used to construct the channel members 1096 and the vertical support member 1052. In particular, the channel members may be secured in position using adhesives (e.g. cyanoacrylate or epoxy compositions), conventional mechanical fasteners (e.g. screws, rivets, and the like), or by welding if metal parts are involved.

Each of the channel members 1096 includes a first (e.g. upper) end 1098, a second (e.g. lower) end 1100, a first side panel 1102, and a second side panel 1104 spaced apart from the first side panel 1102 to form a gap 1106 therebetween (FIG. 17). As discussed further below, each gap 1106 is sized to receive the retaining strip 1076 of one of the brush assemblies 1074 therein. Accordingly, the length of the channel members 1096 and the brush assemblies 1074 will be substantially equal as illustrated. Each channel member 1096 is positioned directly on the outer surface 1062 of the vertical support member 1052 as illustrated in FIG. 16 so that it extends upwardly from the lower end 1056 along the medial section 1058 of the support member 1052. As illustrated in the embodiment of FIG. 16, the second end 1100 of each channel member 1096 extends beyond the lower end 1056 of the support member 1052. However, each channel member 1096 is mounted in position so that it stops immediately before the threaded section 1060 of the upper end 1054 as shown in FIG. 16.

With reference to FIG. 17, the first side panel 1102 further includes an outer longitudinal edge 1108 having a ridge portion 1110 thereon which extends inwardly into the gap 1106. Likewise, the second side panel 1104 comprises an outer longitudinal edge 1112 having a ridge portion 1114 thereon which extends inwardly into the gap 1106 directly opposite the ridge portion 1110 on the first side panel 1102. To mount an individual brush assembly 1074 within a selected channel member 1096, the brush assembly 1074 is slidably inserted into the gap 1106 through the first end 1098 of the channel member 1096 until it is completely positioned within the gap 1106. As illustrated in FIG. 16, the first end 1098 is open in order to facilitate receipt of the brush assembly 1074. The brush assembly 1074 is maintained within the gap 1106 of the channel member 1096 by abutting engagement of the retaining strip 1076 of the brush assembly 1074 with the ridge portion 1110 on the first side panel 1102 and the ridge portion 1114 on the second side panel 1104. As a result, the bristles 1068 will extend outwardly from the gap 1106 in the channel member 1096, but the brush assembly 1074 will not experience outward (forward) movement from the gap 1106 during operation of the system 10. To prevent the brush assembly 1074 from sliding downwardly and out of the gap 1106 in the channel member 1096 at the second end 1100 thereof (which is adjacent the lower end 1056 of the vertical support member 1052 as illustrated in FIG. 16), the first side panel 1102 and the second side panel 1104 are each tilted (e.g. bent) inwardly toward each other at the second end 1100 (e.g. position 1116) to block movement of the brush assembly 1074 downward through the second end 1100 of the channel member 1096. In this manner, premature displacement of each brush assembly 1074 from its corresponding channel member 1096 is effectively prevented.

The design illustrated in FIGS. 16–19 and described above provides numerous benefits. It enables the brush assemblies 1074 to be securely retained within the channel members 1096 while allowing rapid removal of the brush assemblies 1074 when replacement is necessary. To remove a selected brush assembly 1074 from its corresponding channel member 1096, the brush assembly 1074 is urged upwardly and moved out of the gap 1106 through the first end 1098 of the channel member 1096. Removal is accomplished in a highly efficient manner without the need for any tools or mechanical fasteners.

Figure 19:
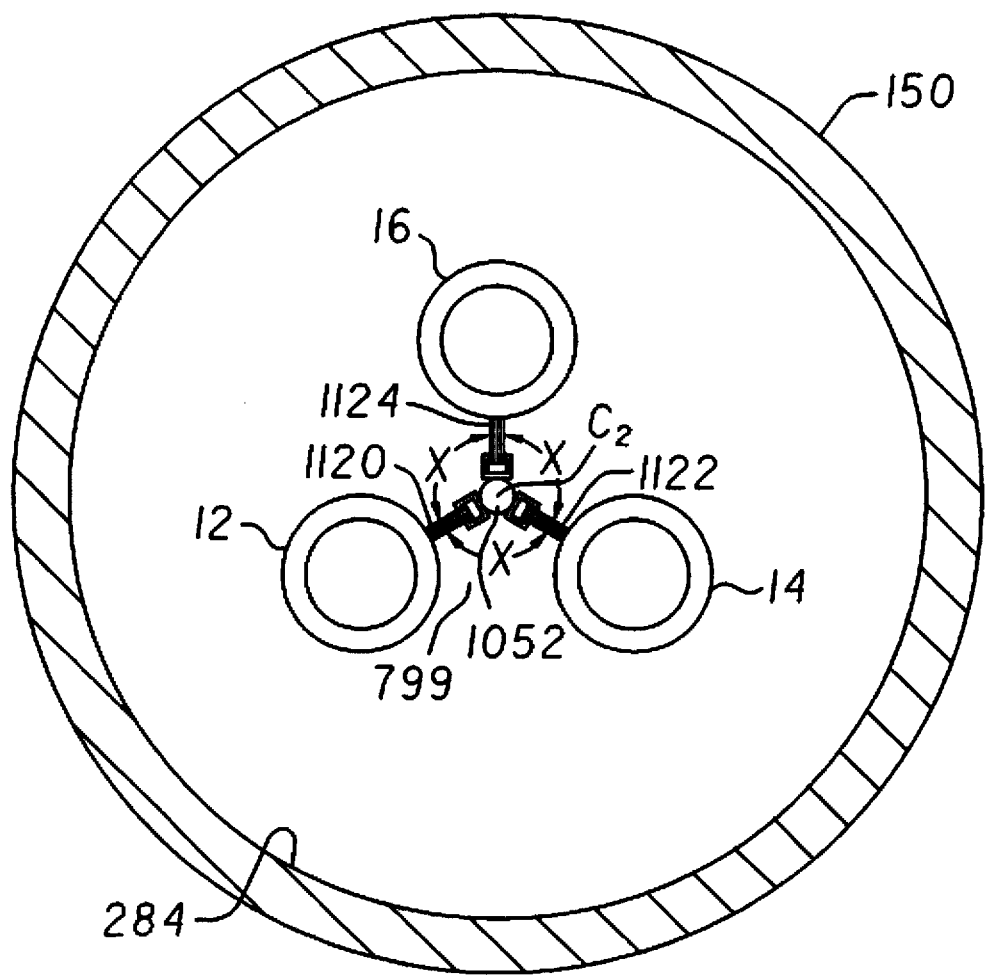
FIG. 19 is a schematic cross-sectional view of the primary housing in the system of FIG. 1 having the alternative cartridge wiping assembly of FIG. 16 positioned therein adjacent the filter cartridge units.

As noted above, the vertical support member 1052 with the wiping members 1064 thereon (regardless of form) is secured to and within the primary housing 150 adjacent to and parallel with the filter cartridge units 12, 14, 16. This arrangement enables the exterior surface of each cartridge unit 12, 14, 16 (e.g. the side wall portion 28 of cartridge unit 12) to be positioned against and in direct physical contact with at least one of the rows 1066 of wiping members 1064. In a preferred embodiment one row 1066 of wiping members 1064 will be provided for each filter cartridge unit in the system 10. The exact location of the vertical support member 1052 within the housing 150 will vary depending on the number and arrangement of filter cartridge units within the system 10. Any location may be selected which will allow the rows 1066 of wiping members 1064 to directly contact the cartridge units 12, 14, 16. However, in the embodiment of FIGS. 7, 18, and 19 which involves the use of three cartridge units 12, 14, 16 in a triangular arrangement, the vertical support member 1052 will be positioned within the open center zone 799 surrounded by and parallel to the cartridge units 12, 14, 16. In accordance with this arrangement as discussed above, each of the cartridge units 12, 14, 16 is spaced equidistantly from each other in order to form the open center zone 799 surrounded by the cartridge units 12, 14, 16. To effectively clean the cartridge units 12, 14, 16 when configured in a triangular arrangement, the vertical support member 1052 is oriented within the open center zone 799 so that each of the cartridge units 12, 14, 16 is again positioned against and in direct physical contact with one of the rows 1066 of wiping members 1064 (FIG. 19). Optimum results will be achieved in the embodiment of FIG. 19 when the vertical support member 1052 is positioned at a location precisely within the center "$C_2$" of the open center zone 799 so that the support member 1052 is spaced equidistantly from each of the filter cartridge units 12, 14, 16. This configuration is again illustrated in FIG. 19 in which each of the cartridge units 12, 14, 16 is in direct physical contact with one of the rows 1066 of wiping members 1064 (e.g. bristles 1068). In the embodiment of FIG. 19, the rows 1066 of wiping members 1064 may be divided into three separate rows, namely, a first row 1120, a second row 1122, and a third row 1124. The first row 1120 is in contact with cartridge unit 12, the second row 1122 contacts cartridge unit 14, and the third row 1124 engages cartridge unit 16. The first, second, and third rows 1120, 1122, 1124 of wiping members 1064 (and the channel members 1096 associated therewith) are each spaced equidistantly from each other on the vertical support member 1052. As a result, each of the first, second, and third rows 1120, 1122, 1124 of wiping members 1064 (bristles 1068) are positioned at an angle "X" relative to each other in which X=120° (FIG. 19). During rotation of the cartridge units 12, 14, 16, the first, second, and third rows 1120, 1122, 1124 of wiping members 1064 will wipe (e.g. rub) against the outer surfaces (side wall portions) of the cartridge units 12, 14, 16 to remove collected debris in a highly efficient manner.

As previously indicated, the vertical support member 1052 and attached rows 1066 of wiping members 1064 are fixedly secured in position within the primary housing 150 adjacent the cartridge units 12, 14, 16. Attachment is undertaken in a manner which prevents rotation/movement of the cartridge wiping assembly 1050 during system operation. Many different methods may be employed to attach the cartridge wiping assembly 1050 in a vertical, fixed position parallel to the cartridge units 12, 14, 16, and the present invention shall not be limited to any particular attachment system. With reference to FIG. 16, a representative attachment system for the vertical support member 1052 of the cartridge wiping assembly 1050 is illustrated. As noted above, the upper end 1054 of the support member 1052 has a threaded section 1060. The threaded section 1060 is designed for threadable engagement within the threaded bore 1032 in the bottom surface 562 of the secondary housing 400 (FIG. 6). The bore 1032 is positioned at the center "C₁" of the secondary housing 400 so that the cartridge wiping assembly 1050 will be precisely centered within the open center zone 799 between the cartridge units 12, 14, 16 as shown in FIGS. 18–19.

In the embodiment of FIG. 16, the cartridge wiping assembly 1050 is secured in position by complementary engagement of the threaded upper end 1054 of the vertical support member 1052 within the threaded bore 1032. The lower end 1056 of the support member 1052 is unattached to any portions of the housing 150. While the attachment methods and components described above will provide effective results, the vertical support member 1052 may also optionally include a threaded section on the lower end 1056 (not shown) which would be positioned within a complementary threaded bore (not shown) in the cartridge unit support member 180 associated with the housing 150. In this alternative embodiment, the channel members 1096 would be moved upwardly from the position illustrated in FIG. 16 to provide free access to the lower end 1056. The use of an optional threaded section at the lower end 1056 may be provided instead of or in addition to the threaded section 1060 at the upper end 1054 of the support member 1052. Furthermore, as noted above, other suitable attachment systems may also be used in connection with the cartridge wiping assembly 1050 (and the other cartridge wiping systems disclosed herein). The present invention shall not be limited to any particular attachment components or hardware for this purpose.

Use of the cartridge wiping assembly 1050 shown in FIG. 16 and described above will provide an enhanced level of cleaning within the system 10 (especially when highly turbid liquids are being filtered as discussed above). The life span of the cartridge wiping assembly 1050 and attached wiping members 1064 will depend on numerous factors including the type of materials being used in connection with the wiping members 1064, the surface characteristics of the cartridge units 12, 14, 16, and the accumulated operating time of the system 10. The point at which replacement of the brush assemblies 1074 is necessary can be readily determined by visual inspection of the wiping members 1064 on each brush assembly 1074. If the wiping members 1064 (e.g. bristles 1068) on a given brush assembly 1074 are sufficiently worn to prevent complete contact of the wiping members 1064 with the cartridge units 12, 14, 16, then replacement of the brush assembly 1074 is warranted. Replacement is rapidly and efficiently accomplished in the embodiment of FIGS. 16–19 as discussed above. Finally, as previously noted, the present invention shall not be limited to the structures and components illustrated in FIGS. 16–19 which are provided for example purposes only. Other components and materials may be used to achieve the general goals of the present invention as discussed in detail above.

Operation of the System in an Enhanced Cleaning Mode in Accordance with the Embodiments of FIGS. 13–19

Use of the system 10 in accordance with the embodiments of FIGS. 13–19 to filter solid materials from a selected fluid (e.g. liquid or gas) will occur in exactly the same manner described above in section "A" which is incorporated by reference in this portion of the Detailed Description. The system 10 as illustrated in FIGS. 1–9 may be fitted with either the cartridge wiping assembly 1000 of FIGS. 13–15 or the cartridge wiping assembly 1050 of FIGS. 16–19. For the sake of clarity, the remainder of this section shall be discussed with reference to cartridge wiping assembly 1000 with the understanding that the claimed methods are equally applicable to cartridge wiping assembly 1050.

As previously described, the system 10 specifically includes housing 150, filter cartridge units 12, 14, 16, and drive means 630 (discussed above). In a preferred embodiment, the cartridge units 12, 14, 16 will be positioned within housing 150 in the triangular arrangement of FIGS. 7, 15, and 19. As a result, the cartridge units 12, 14, 16 are spaced equidistantly from each other in order to form the open center zone 799 surrounded by the cartridge units 12, 14, 16. In accordance with the information provided above, the cartridge wiping assembly 1000 includes a vertical support member 1002 having wiping members 1004 secured thereto. The wiping members 1004 are effectively attached to and within the housing 150 using the vertical support member 1002. The drive means 630 (which includes motor 632 and belt 640 [FIG. 2]) is operatively connected to all of the filter cartridge units 12, 14, 16. This configuration enables all of the cartridge units 12, 14, 16 to be simultaneously rotated around their respective longitudinal axes. Rotation in this manner causes the cartridge units 12, 14, 16 to filter solid materials from fluid materials with increased efficiency. A fluid material (e.g. a liquid or gas) having solid materials suspended therein is then placed in contact with and around all of the cartridge units 12, 14, 16 in the housing 150.

Next, all of the cartridge units 12, 14, 16 are simultaneously rotated using the drive means 630 to create fluid turbulence around and between the cartridge units 12, 14, 16. This process enhances the filtration efficiency of the system 10 as discussed above. The filtered fluid passes through the cartridge units 12, 14, 16 while preventing passage of the solid materials.

The vertical support member 1002 and attached wiping members 1004 are positioned within the housing 150 at a location adjacent the cartridge units 12, 14, 16 as noted above. Specifically, the support member 1002 with the wiping members 1004 thereon is placed at a location within the housing 150 so that the side wall portion of each cartridge unit 12, 14, 16 is positioned against and in direct physical contact with at least one of the wiping members 1004. When a triangular arrangement of cartridge units 12, 14, 16 (e.g. to clean the cartridge units 12, 14, 16) is employed, the wiping members 1004 and vertical support member 1002 will be located within the open center zone 799 in the housing 150 so that the side wall portion of each cartridge unit 12, 14, 16 is positioned against and in direct physical contact with at least one of the wiping members 1004 in the open center zone 799. Thereafter, the step of primary interest in the embodiments of FIGS. 13–19 is initiated. This step involves wiping the side wall portions of the filter cartridge units 12, 14, 16 with the wiping members 1004 during cartridge unit rotation to remove any collected debris therefrom. When a triangular arrangement of cartridge units 12, 14, 16 is involved, the wiping step of the claimed invention is accomplished within the open center zone 799 as shown in FIGS. 15 and 19. A particularly high level of cleaning efficiency is achieved when wiping of the cartridge units 12, 14, 16 occurs within the open center zone 799. The high turbulence level in the open center zone 799 and the physical wiping action of the wiping members 1004 synergistically cooperate to provide enhanced cleaning efficiency.

Finally, as previously discussed above in section "A", filtered fluids within the cartridge units 12, 14, 16 are appropriately collected. Debris removed by the cartridge wiping assembly 1000 remains inside the housing 150. In the case of particulate debris which remains after gases are filtered, removal of the debris may be accomplished by detachment of the housing 150 from the system 10 so that it can be cleaned. When liquids are being processed by the system 10, the removed debris remains suspended within the residual liquids that normally remain inside the housing 150 after the system 10 is deactivated. These materials can be withdrawn from the system 10 by opening the stopcock assembly 178 on the drain conduit 177 extending outwardly from the housing 150 (FIG. 1). As a result, collected solid debris and residual liquids will pass downwardly through the conduit 177 and stopcock assembly 178. The liquids and solids may thereafter be discarded or further treated as desired. It should also be noted that the foregoing methods shall not be limited to filtration systems using three cartridge units. The claimed methods are likewise applicable to other filtration systems having a different number of filter cartridge units.

Having herein described preferred embodiments of the invention, it is anticipated that suitable modifications may be made thereto by individuals skilled in the relevant art which nonetheless remain within the scope of the invention. For example, the construction materials, component size parameters (e.g. length and width of the cartridge units), the number of cartridge units, the internal configuration of the cartridge units, and the arrangements of conduits, ports, bores, openings and the like in the system may all be varied within the scope of the invention. The filtration, gas diffusion, and enhanced cleaning systems discussed herein may therefore involve the use of cartridge units having different design features and orientations from those described above. Likewise, the components, parameters, structures, and materials associated with the cartridge wiping assemblies disclosed herein may be varied, provided that the general goals of the present invention are achieved. Thus, the invention shall only be construed in connection with the following claims:

The invention that is claimed is:

1. A high efficiency, self-cleaning fluid filtration system comprising:

a housing;

a plurality of elongate filter cartridge units positioned within said housing, each of said cartridge units comprising a longitudinal axis, an upper end, a lower end, a side wall portion comprised of filter material, and an interior region therein surrounded by said side wall portion for receiving fluid materials which pass through said side wall portion, each of said cartridge units being rotatable around said longitudinal axis thereof;

an elongate vertical support member secured to and within said housing adjacent said filter cartridge units, said support member further comprising a plurality of elongate channel members secured thereto, each of said channel members comprising a first end, a second end, a first side panel, and a second side panel spaced apart from said first side panel to form a gap therebetween, said first side panel further comprising an outer longitudinal edge having a ridge portion thereon which extends inwardly into said gap, said second side panel further comprising an outer longitudinal edge having a ridge portion thereon which extends inwardly into said gap, said vertical support member further comprising a plurality of elongate brush assemblies thereon, each of said brush assemblies comprising a longitudinal retaining strip which comprises a row of bristles secured to said strip and extending outwardly therefrom, each of said brush assemblies being positioned within said gap of one of said channel members and retained therein by engagement of said retaining strip against said ridge portion on said first side panel and said ridge portion on said second side panel, said first side panel and said second side panel of each of said channel members being tilted inwardly toward each other at said second end thereof to prevent premature brush assembly displacement through said second end, said support member being oriented within said housing so that said side wall portion of each of said cartridge units is placed against and in direct contact with said bristles of at least one of said brush assemblies, said brush assemblies removing collected debris from said side wall portion of each of said cartridge units during rotation thereof; and drive means operatively connected to all of said filter cartridge units for simultaneously rotating each of said cartridge units around said longitudinal axis thereof, said rotating of said cartridge units by said drive means causing said cartridge units to filter solid materials from said fluid materials with increased efficiency, said brush assemblies removing said debris from said side wall portion of each of said cartridge units during said rotation thereof to further increase said efficiency of said filtration system.

2. A high efficiency, self-cleaning fluid filtration system comprising:

a housing;

three individual elongate filter cartridge units positioned within said housing in a triangular arrangement in which each of said cartridge units is spaced equidistantly from each other in order to form an open center zone surrounded by said cartridge units, each of said cartridge units comprising a longitudinal axis, an upper end, a lower end, a side wall portion comprised of filter material, and an interior region therein surrounded by said side wall portion for receiving fluid materials which pass through said side wall portion, each of said cartridge units being rotatable around said longitudinal axis thereof;

an elongate vertical support member secured to and within said housing, said support member being positioned within said open center zone surrounded by said filter cartridge units, said support member further comprising three elongate channel members secured thereto and spaced equidistantly from each other on said support member, each of said channel members comprising a first end, a second end, a first side panel, and a second side panel spaced apart from said first side panel to form a gap therebetween, said first side panel further comprising an outer longitudinal edge having a ridge portion thereon which extends inwardly into said gap, said second side panel further comprising an outer longitudinal edge having a ridge portion thereon which extends inwardly into said gap, said vertical support member further comprising three elongate brush assemblies thereon, each of said brush assemblies comprising a longitudinal retaining strip comprising a row of bristles secured to said strip and extending outwardly therefrom, each of said brush assemblies being positioned within said gap in one of said channel members and retained therein by engagement of said retaining strip against said ridge portion on said first side panel and said ridge portion on said second side panel, said first side panel and said second side panel of each of said channel members being tilted inwardly toward each other at said second end thereof to prevent premature brush assembly displacement through said second end, said support member being oriented within said open center zone surrounded by said cartridge units so that said side wall portion of each of said cartridge units is placed against and in direct contact with said bristles on at least one of said brush assemblies, said brush assemblies removing collected debris from said side wall portion of each of said cartridge units during rotation thereof; and drive means operatively connected to all of said cartridge units for simultaneously rotating each of said cartridge units around said longitudinal axis thereof, said rotating of said cartridge units by said drive means causing said cartridge units to filter solid materials from said fluid materials with increased efficiency, said brush assemblies removing said debris from said side wall portion of each of said cartridge units during said rotation thereof to further increase said efficiency of said filtration system.

* * * * *